United States Patent
Katayama et al.

(10) Patent No.: US 7,017,071 B2
(45) Date of Patent: Mar. 21, 2006

(54) APPARATUS FOR MANAGING A DEVICE, PROGRAM FOR MANAGING A DEVICE, STORAGE MEDIUM ON WHICH A PROGRAM FOR MANAGING A DEVICE IS STORED, AND METHOD OF MANAGING A DEVICE

(75) Inventors: Kojiro Katayama, Tokyo (JP); Makoto Kawashima, Kanagawa (JP); Junichi Hirose, Sydney (AU); Kazushi Omori, Chiba (JP); Hiroyuki Hara, Kanagawa (JP); Shinichi Nakamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 569 days.

(21) Appl. No.: 09/985,225

(22) Filed: Nov. 2, 2001

(65) Prior Publication Data

US 2002/0073356 A1 Jun. 13, 2002

(30) Foreign Application Priority Data

Nov. 17, 2000 (JP) .............................. 2000-351263

(51) Int. Cl.
G06F 11/00 (2006.01)

(52) U.S. Cl. .............................. 714/4; 714/47; 714/48; 709/223; 709/224; 379/9.03
(58) Field of Classification Search .................... 714/4, 714/47, 48; 709/223, 224; 379/9.03
See application file for complete search history.

(56) References Cited

U.S. PATENT DOCUMENTS

| | | | | |
|---|---|---|---|---|
| 5,666,481 A | * | 9/1997 | Lewis | 714/4 |
| 5,815,652 A | * | 9/1998 | Ote et al. | 714/31 |
| 5,896,440 A | * | 4/1999 | Reed et al. | 379/9.03 |
| 6,138,249 A | * | 10/2000 | Nolet | 714/25 |
| 6,587,647 B1 | * | 7/2003 | Watanabe et al. | 399/8 |
| 6,591,296 B1 | * | 7/2003 | Ghanime | 709/224 |
| 6,601,190 B1 | * | 7/2003 | Meyer et al. | 714/37 |
| 6,654,915 B1 | * | 11/2003 | Lu et al. | 714/57 |
| 6,697,969 B1 | * | 2/2004 | Merriam | 714/46 |
| 6,931,102 B1 | * | 8/2005 | Onweller et al. | 379/9 |
| 2002/0091821 A1 | * | 7/2002 | Katayama et al. | 709/224 |

OTHER PUBLICATIONS

"Microsoft Computer Dictionary", 1999, Microsoft Press, 4th ed., pp 327.*

* cited by examiner

Primary Examiner—Robert Beausoliel
Assistant Examiner—Emerson Puente
(74) Attorney, Agent, or Firm—Fitzpatrick, Cella, Harper & Scinto

(57) ABSTRACT

A remote site managing system manages, in a unified fashion, computers and peripheral devices installed at a customer site. The remote site managing system automatically receives information indicating a failure which has occurred or indicating a high possibility that a failure will occur in some of PC/servers or peripheral devices installed in a customer's office and provides maintenance services without causing a customer to be concerned about anything. Furthermore, transmission of a request to a maintenance service company and reception of a service operation report from the service company are performed by the remote site managing system in an unified fashion.

2 Claims, 35 Drawing Sheets

FIG. 8

| FIELD | LENGTH (BYTES) | USE |
|---|---|---|
| TAG | | |
| FLAG | 1 | VARIOUS KINDS OF INFORMATION ARE REPRESENTED BY BIT VALUES.<br>COMMNICATION MEANS IS SPECIFIED BY BITS xxx..... AS FOLLOWS :<br>  B'100' : TCP / IP<br>  B'010' : DIAL-UP<br>  B'001' : E-MAIL<br>WHETHER DATA IS CONTINUED IS INDICATED AT BIT ...x AS FOLLOWS :<br>  B'0' : SIMPLE DATA OR A FINAL DATA<br>  B'1' : DATA IS CONINUED TO THE FOLLOWING DATA |
| DATA TYPE | 1 | THE DATA TYPE IS INDICATED AS FOLLOWS :<br>  X'01' : AUTHENTICAION REQUEST DATA<br>  X'02' : PARAMETER SETTING REQUEST DATA<br>  X'04' : DEVICE INFORMATION ACQUISITION REQUEST DATA<br>  X'08' : EVENT INFORMATION NOTIFICATION DATA<br>  X'10' : RESPONSE DATA<br>  X'80' : DISCONNECTION REQUEST DATA |
| JOB ID | 1 | THE JOB ID INDICATES THE SEQUENCE. THE JOB ID IS NECESSARY TO BE MAINTAINED UNCHANGED DURING THE SESSION.<br>  X'00' : SETTING OF A PARAMETER<br>  X'01' : ACQUISION OF DEVICE INFORMATION<br>  X'02' : NOTICE OF EVENT INFORMATION |
| RETURNED VALUE | 1 | WHEN THE DATA TYPE IS "RESPONSE DATA" (X'10'), THE VALUE TO BE RETURNED IS DESCRIBED IN THIS FIELD. WHEN THE DATA TYPE IS "DISCONNECTION REQUEST" (X'80'), THE REASON FOR DISCONNECTION IS DESCRIBED. WHEN THE DATA TYPE IS OTHER THAN RESPONSE DATA (X'10') AND DISCONNECTION REQUEST DATA (X'80') |
| DATA LENGTH | 4 | THE LENGTH OF DATA IS REPRENTED IN UNITS OF BYTES (NETWORK BYTE ORDER) |
| DATA | VARIABLE | DATA |

FIG. 21

| DEVICE NUMBER / SERIAL NUMBER | DATE / TIME OF OCCURRENCE | FAILURE CODE | DATA INDICATING WHETHER THE FAILURE OCCURRED IN A PC OR A PERIPHERAL DEVICE |

FIG. 23

| FILE (F) | EDIT (E) | DISPLAY (V) | INSERT (I) | FORMATS (O) | TOOLS (T) | DATA (D) | WINDOW (W) | HELP (H) |

USER INFORMATION

| CUSTOMER NAME | CA (LTD.) |
| SECTION | PLANNING DEPARTMENT |
| TEL | 03-3765-XXXX |
| FAX | 03-3765-YYYY |
| E-MAIL | rds@zzz. |

DEVICE INFORMATION

| DEVICE NUMBER / SERIAL NUMBER | ABC12345 |
| DEVICE TYPE | IR5000 |
| ENVIRONMENT | |
| DEVICE LOCATION | INNERMOST LOCATION ON 1F |

HISTORY OF FAILURES

| DATE / TIME | CODE | TYPE | LOCATION | NOTE |
|---|---|---|---|---|
| 2000. 10. 18 | Exxx | E | xxxxxx | |
| 2000. 10. 3 | Exxx | J | yyyyyyyyy | |
| 2000. 9. 13 | Exxx | A | zzzzzzzz | |

DEVICE LIST    CLOSE

FIG. 24

| FAILURE CODE | DEVICE TYPE | WHO SHOULD DEAL WITH THE FAILURE | ACTION TO BE TAKEN |
|---|---|---|---|
| E001 | Device | CUSTOMER | TURN ON / OFF THE POWER SUPPLY |
| Exxx | Device | SERVICE COMPANY | REPLACE A COMPONENT xxxx |
| Exxx | Device | SERVICE COMPANY | VISIT THE FAILURE LOCATION AND INVESTIGATE THE FAILURE |
| −1000 | PC | CUSTOMER | REPLACE THE DISK |
| −1001 | PC | SERVICE COMPANY | REPLACE THE HARD DISK |
| | | | |
| | | | |
| | | | |

FIG. 25

| DEVICE NUMBER / SERIAL NUMBER | MANUFACTURER | CUSTOMER CODE | CUSTOMER SUB CODE | LOCATION | SERVICE COMPANY CODE |
|---|---|---|---|---|---|
| ABC12345 | Caa | 0001 | 01 | INNERMOST LOCATION ON 1F | 300 |
| 12345678 | IBB | 0001 | 01 | MACHINE ROOM | 500 |
| | | | | | |
| | | | | | |
| | | | | | |

FIG. 26

| CUSTOMER CODE | CUSTOMER SUB CODE | COMPANY NAME | DEPARTMENT | ADDRESS | TEL | FAX | Email | PERSON | CONTRACT LEVEL | PC SERVICE COMPANY CODE | DEVICE SERVICE COMPANY CODE |
|---|---|---|---|---|---|---|---|---|---|---|---|
| 0001 | 01 | ABC (LTD) | TOKYO HEAD OFFICE | MARUNOUCHI CHIYODA-KU | 03-3555-xxxx | | xxx@yyy.co.jp | | 1 | | |
| 0001 | 02 | ABC (LTD) | YOKOHAMA BRANCH OFFICE | NISHI-KU, YOKOHAMA | 045-312-xxxx | | | | 2 | | |
| 0002 | 01 | NIPPON INDUSTRIAL CO. | | KASUMIGASEKI, CHIYODA-KU | | | | | 3 | | |
| 0003 | 01 | K CO. | TOKYO HEAD OFFICE | SIMOMARUKO, OHTA-KU | | | | | | | |
| 0003 | 02 | K CO. | KANAGAWA BRANCH OFFICE | TOTSUKA-KU, YOKOHAMA | | | | | | | |
| 0003 | 03 | K CO. | CHIBA BRANCH OFFICE | MIHAMA-KU, CHIBA | | | | | | | |

FIG. 28

| TROUBLE TICKET ID | STATUS | DATE/TIME OF OCCURRENCE | DATE/TIME OF ACTION | CUSTOMER CODE | CUSTOMER SUB CODE | DEVICE NUMBER/ SERIAL NUMBER | SERVICE COMPANY | SERVICE PERSON | CAUSE | ACTION TAKEN |
|---|---|---|---|---|---|---|---|---|---|---|
| 0010300001 | DONE | 2000/10/30 10:21 | 2000/10/30 11:18 | 0001 | 02 | ABC12345 | 3001 | xxx | LIFETIME OF A COMPONENT xxxx | THE COMPONENT xxxx HAS BEEN REPLACED |
| 0010300002 | BEING DEALT WITH | 2000/10/30 11:54 | | 0003 | 01 | xxxxx | 3002 | oooo | | |
| 0010300003 | BEING DEALT WITH | 2000/10/30 15:09 | | 0001 | 01 | xxxxxx | 3001 | yyyy | | |

FIG. 30

| TROUBLE ID | | SERVICE REQUEST | |
|---|---|---|---|
| USER INFORMATION | | DEVICE INFORMATION | |
| CUSTOMER NAME | | DEVICE NUMBER / SERIAL NUMBER | |
| SECTION | | DEVICE TYPE | |
| TEL | | | |
| FAX | | | |
| E-MAIL | | | |

TIME OF OCCURRENCE  FAILURE CODE

XX(MONTH), YY(DATE), 2001
AA(HOUR) BB(MIN)

TYPE OF ACTION TO BE TAKEN   ACTION TO BE TAKEN

○ ISOLATE THE FAILED DEVICE
● REPAIR THE FAILED DEVICE

TIME LIMIT   DAY MONTH YEAR   DATE OF ISSUING THE REQUEST

YY / XX, 2001

ISSUER ○○ △△

---

SERVICE REPORT

CAUSE

ACTION TAKEN

DATE OF ACTION   30 / 10, 2000
SERVICE COMPANY NAME   XXX GINZA BRANCH
SERVICE PERSON NAME   XXXXX

FIG. 31

| SERVICE COMPANY CODE | DEVICE TYPE | COMPANY NAME | DEPARTMENT | ADDRESS | TEL | FAX | Email | PERSON |
|---|---|---|---|---|---|---|---|---|
| 3001 | Device/PC | CSS | GINZA OFFICE | GINZA, CHUO-KU·· | 03-3555-XXXX | | | |
| 3002 | Device | CSS | YOKOHAMA OFFICE | YOKOHAMA OFFICE·· | | | | |
| 3003 | Device | CSS | CHIBA OFFICE | CHIBA·· | | | | |
| | | | | | | | | |
| | | | | | | | | |
| | | | | | | | | |

FIG. 34

| DEVICE NUMBER / SERIAL NUMBER | YEAR / MONTH | COUNTER VALUE | BOTH-SIDE | MULTIPLE PRINTING | 2in1 | 4in1 | OUTPUT VIA FAX | PRINTED | SCANNED AND TRANSMITTED | TRANSMITTED BY E-MAIL | A3 | A4 | A4R | A5 | B4 | B5 | B5R | LET | LETR | LGL | OTHERS |
|---|---|---|---|---|---|---|---|---|---|---|---|---|---|---|---|---|---|---|---|---|---|
| ABC12345 | 0008 | | | | | | | | | | | | | | | | | | | | |
| ABC12345 | 0009 | | | | | | | | | | | | | | | | | | | | |
| ABC12345 | 0010 | | | | | | | | | | | | | | | | | | | | |

FIG. 35

REPORT OF OPERATION IN (MONTH), (YEAR)

NUMBER OF COPIED SHEETS

NUMBERS FOR RESPECTIVE TYPES

| BOTH-SIDES | |
|---|---|
| MULTIPLE COPYING | |
| 2-IN-1 COPYING | |
| 4-IN-1 COPYING | |

NUMBERS FOR RESPECTIVE SIZES

| A3 | |
|---|---|
| A4 | |
| A4R | |
| A5 | |
| B4 | |
| B5 | |

FAILURE HISTORY

| TIME OF OCCURRENCE | RECOVERY TIME | DEVICE TYPE / DEVICE NUMBER | PHENOMENON | CAUSE | ACTION TAKEN |
|---|---|---|---|---|---|
| | | | | FAILURE OF COMPONENT A | COMPONENT A HAS BEEN REPLACED |
| | | | | | |
| | | | | | |
| | | | | | |

DIAGNOSIS RESULT

* THERE IS NO PROBLEM AT ALL.
* ALTHOUGH A TROUBLE OCCURRED, THE TROUBLE HAS BEEN RESOLVED.
* THERE IS A TENDENCY FOR THE FREQUENCY OF TROUBLES TO INCREASE. OBSERVATION IS REQUIRED FOR A WHILE.

(DAY) (MONTH), 2001

APPARATUS FOR MANAGING A DEVICE, PROGRAM FOR MANAGING A DEVICE, STORAGE MEDIUM ON WHICH A PROGRAM FOR MANAGING A DEVICE IS STORED, AND METHOD OF MANAGING A DEVICE

BACKGROUND OF THE INVENTION

1. Field of the Invention

The present invention relates to a remote site managing system for remotely and comprehensively monitoring states of PC/server devices such as a general-purpose personal computer (PC) or a server computer connected via a computer network or the like and also states of peripheral devices serving as input/output devices such as a printer, a copying machine, and a scanner.

2. Description of the Related Art

A system is known which is installed in an office to acquire information about an operation of a device installed in the office and also error information, log information, etc., thereof, to monitor and manage the device. It is also known to transmit, via a network, such information acquired in an office to a center server installed outside the office in order to monitor and manage the information thereby.

However, the known monitoring/managing system has the capability of monitoring or managing either only PC/server devices, that is, general-purpose computers, or only peripheral devices such as a printer or a copying machine.

This is because there is a large difference between the management procedure for general-purpose computers and that for peripheral devices. More specifically, to manage general-purpose computers, it is required that a program be written so as to provide a desired function depending upon a computer environment such as an operation system and the program be executed on a computer which is also managed by the managing system. In contrast, in the case of peripheral devices, it is practically impossible to add or modify a function.

Besides, in the case of peripheral devices, there are no standards for data formats and communication protocols for use by a monitoring/managing system in communicating with a peripheral device. Therefore, it is required to develop a management procedure for each peripheral device. Thus, each peripheral device is separately connected to a managing site system and separately managed.

As described above, the conventional management system for managing peripheral devices and that for managing PC/servers cannot be integrated into a single system, and they are used absolutely separately.

It is becoming increasingly popular to use both types of devices, that is, PC/servers and peripheral devices in an office, and thus there is a need for a technique for integrally monitoring and managing all those devices and performing maintenance service upon them.

However, to monitor and manage, using the conventional technique, both a PC/server and a peripheral device installed in an office, it is required for a service company (managing site) to install both systems for separately monitoring and managing the respective types of devices, wherein it is required to acquire information about the respective types of devices via separate communication lines. Therefore, the maintenance company has to perform a complicated management process, and high operating and running costs are needed.

SUMMARY OF THE INVENTION

In view of the above, it is an object of the present invention to provide a remote site managing system in which PC/servers and peripheral devices installed in an office are managed in a unified fashion at a managing site.

It is another object of the present invention to provide a remote site managing system in which a managing device automatically receives information indicating a failure which has occurred or indicating a high possibility that a failure will occur in one or more PC/servers or peripheral devices installed in an office, and a maintenance service is provided without troubling the customer, wherein transmission of a request to a maintenance service company and reception of a service operation report from the service company are performed in a unified fashion.

It is still another object of the present invention to provide a remote site managing system in which a device operation report indicating the status of a device installed in an office is generated on the basis of counter information and history of failures and provided to a customer.

According to an aspect of the present invention, a device is managed via a network in such a manner that when data indicating an occurrence of a failure in a device is received, data indicating a request for a service operation is generated. A company to perform a service operation upon the device is selected from a plurality of companies, and the data indicating the request for the service operation is sent to the selected company.

In this aspect, in response to the data indicating the request for the service operation, data indicating a service operation report is preferably sent from the company.

Preferably, in the present aspect of the invention, an identifier is assigned to the request for the service operation when the data indicating the request for the service operation is generated, and the status of the request for the service operation is managed on the basis of the identifier.

In the present aspect of the invention, the data indicating the request for the service operation may be transmitted together with the identifier, and the data indicating the service operation report may be received together with the identifier. The status of the request for the service operation corresponding to the received identifier may be changed in accordance with the received data indicating the service operation report.

In the present aspect of the invention, the data indicating the request for the service operation is preferably transmitted by means of an electronic mail.

Preferably, in the present aspect of the invention, device information identifying a device having a failure is received, and a company is selected on the basis of the received device information.

Preferably, in the present aspect of the invention, failure information identifying a failure is received, and the received failure information is described in the data indicating the request for the service operation.

Preferably, in the present aspect of the invention, data indicating a manner of dealing with the failure identified by the received failure information is described in the data indicating the request for the service operation.

Preferably, in the present aspect of the invention, when it is determined that a customer possessing the device should deal with the failure, customer information associated with the customer and a message indicating the manner of dealing with the detected failure are displayed on a display unit.

Preferably, in the present aspect of the invention, in the case where an outside company should deal with the failure, a company is selected for that purpose.

According to another aspect of the present invention, a device is managed via a network in such a manner that when data indicating an occurrence of a failure in a device is received, data indicating a request for a service operation is generated. The data indicating the request for the service operation is sent to a company assigned to perform a maintenance operation for the device. Count information associated with the device is acquired, and data indicating a device operation report associated with the device is generated in accordance with the acquired count information, wherein device information indicating a device which has encountered a failure a plurality of times is described in the data indicating the device operation report.

Further objects, features and advantages of the present invention will become apparent from the following description of the preferred embodiments with reference to the attached drawings.

BRIEF DESCRIPTION OF THE DRAWING

FIG. 6 is a flow chart illustrating a process performed in response to an occurrence of an event in the device monitoring server 203a.

FIG. 8 is a table illustrating an example of a format of a message transmitted between the device center server 210 and the device monitoring server 203a.

FIG. 21 is a diagram illustrating a data structure of a failure event.

FIG. 23 is diagram illustrating a list of failures which have occurred in a particular device of a customer, wherein the list of failures is displayed on a display screen.

FIG. 24 illustrates a failure code master table.

FIG. 25 illustrates a device number (serial number) master table.

FIG. 26 illustrates a customer mater table.

FIG. 28 illustrates a trouble ticket table.

FIG. 30 illustrates a template file of a service operation request/report.

FIG. 31 illustrates a service company master table.

FIG. 34 illustrates a counter information table.

FIG. 35 illustrates a template file of a device operation report.

DESCRIPTION OF THE PREFERRED EMBODIMENTS

First Embodiment of a Remote Site Managing System

A first embodiment of a remote site managing system according to the present invention is described below with reference to the accompanying drawings.

Figure 1:
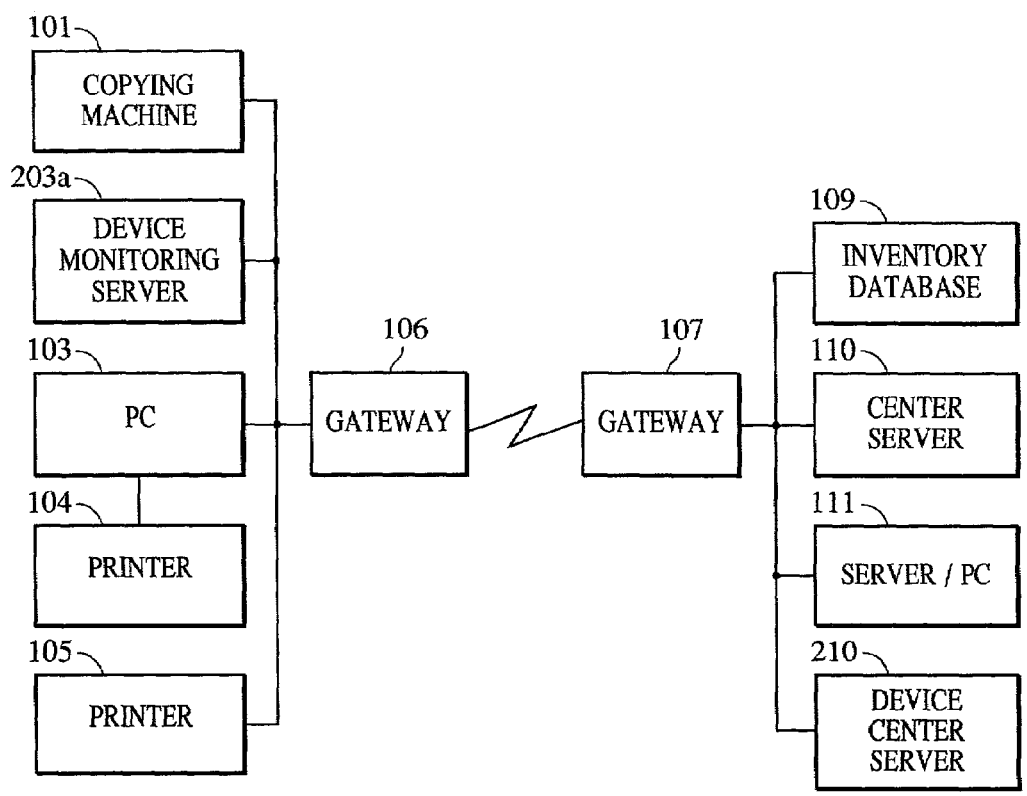
FIG. 1 is a block diagram illustrating a managing site and a managed site.

FIG. 1 is a block diagram illustrating the remote site managing system including a managing site (maintenance service company) and a managed site (office). At the managed site, there are provided general-purpose computers and peripheral devices. More specifically, the general-purpose computers include a PC 103 and a device monitoring server 203a (information device for managing peripheral devices connected via a local network installed in the office), and the peripheral devices include a copying machine 101, a printer 105, and a printer 104 which are connected via a LAN (local area network).

Herein, the term "general-purpose computer" refers not only to a personal computer or a server computer but also a network device such as a gateway or a router which is necessary in a computer network. The term "peripheral device" refers to a device such as a copying machine, a printer, a scanner, a facsimile machine, and a multifunction device.

The PC 103 executes a PC monitoring client module, which will be described in detail later, to manage general-purpose computers connected via a local network installed in an office. The device monitoring server 203*a* and the PC monitoring client module may be executed by physically separate computers or may be executed by a single computer.

Although not shown in FIG. 1, the present remote site managing system includes a data format conversion apparatus for converting data into a format which is suitable for being dealt with by the device monitoring server 203*a* and into a format which is suitable for being dealt with by the PC monitoring client module.

At the managing site, there are provided a center server 110 for managing devices at the managed site in an unified fashion, an inventory database 109 for storing managing information, and a device center server 210 dedicated to managing the peripheral devices at the managed site, with these devices connected via a LAN. The present system further includes another computer, that is, a server/PC 111, connected via the LAN. The computer 111 is used to execute an application program to manage office devices in a unified fashion in accordance with management information.

At the managing site, although not shown in FIG. 1, there are also disposed a display for displaying information received from the managed site and also a data format conversion apparatus for converting data into a format suitable for being dealt with by the center server 110 and into a format suitable for being dealt with by the device center server 210, respectively.

In some cases, a service center (as is the case with an application system 205 shown in FIG. 2) are connected to a plurality of managing sites via an external network or a LAN so as to manage the plurality of managing sites in an unified fashion.

The managed site and the managing site are connected to each other via gateways 106 and 107. Alternatively, the connection between them may be achieved using a general-purpose router or a modem. In the case where the PC monitoring client module is executed on the PC 103, the PC 103 and the center server 109 may be connected to each other via a communication line, and the device monitoring server 203*a* and the device center server 210 may be connected to each other via another separate communication line.

Figure 3:
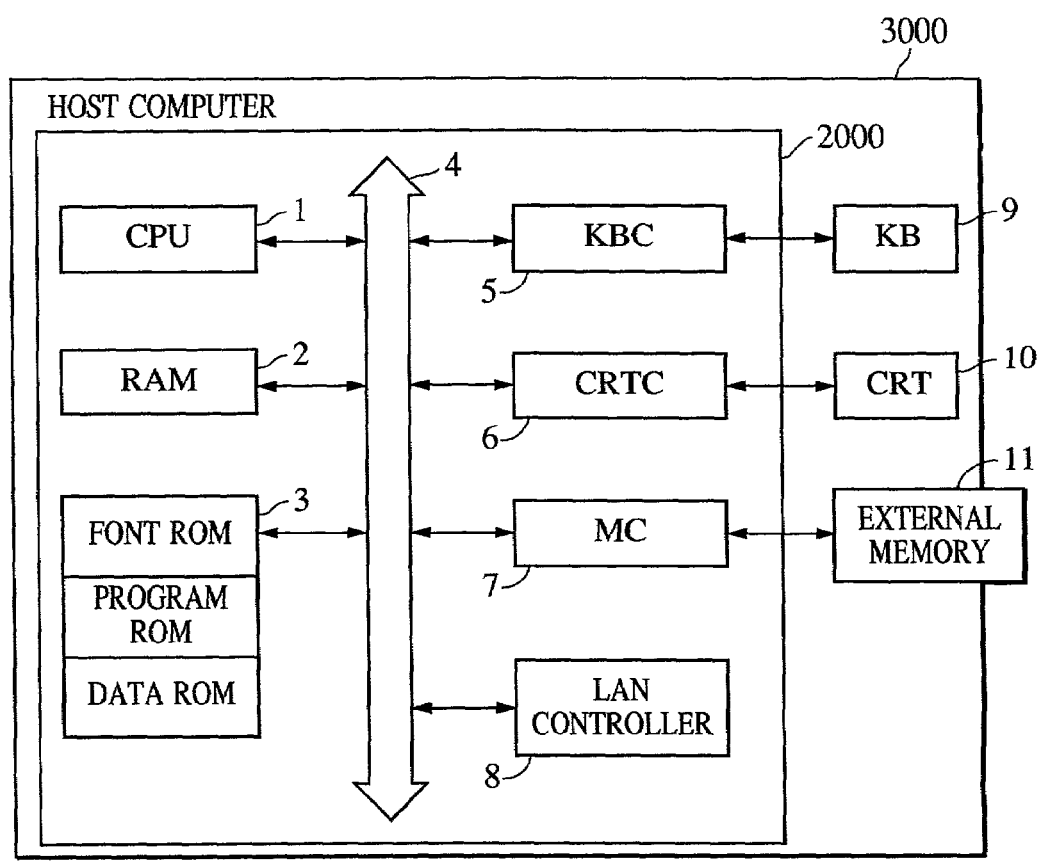
FIG. 3 is a block diagram illustrating a configuration of a computer such as a personal computer or a server.

FIG. 3 is a block diagram illustrating a configuration of a computer serving as a personal computer or a server computer. As shown in FIG. 3, a computer 3000 includes a CPU 1, a RAM 2, a ROM 3, a system bus 4, a KBC 5, a CRTC 6, a MC 7, a LAN controller 8, a KB 9, a CRT 10, and an external memory 11.

The CPU 1 executes a communication control program stored in a program ROM in the ROM 3 to control the operation of transmitting specified data to the outside and also the operation of receiving data from the outside. The CPU 1 also controls the operations of respective devices connected to the system bus 4.

The RAM 2 serves as a main memory and a work area used by the CPU 1. The ROM 3 serves to store a font (in a font ROM), a program (in a program ROM), and data (in a data ROM). The keyboard controller (KBC) 5 controls the operation of inputting data via a keyboard 9 or a pointing device (not shown). The CRT controller (CRTC) 6 controls the operation of displaying data on the CRT display 10. The memory controller (MC) 7 controls accessing to the external memory 11. The external memory 11 such as a hard disk (HD) or a floppy disk (FD) is used to store a boot program, various applications, font data, a user file, and an edit file which will be described later. The LAN controller 8 is connected to a network so as to control communication with another device connected via the network.

Figure 2:
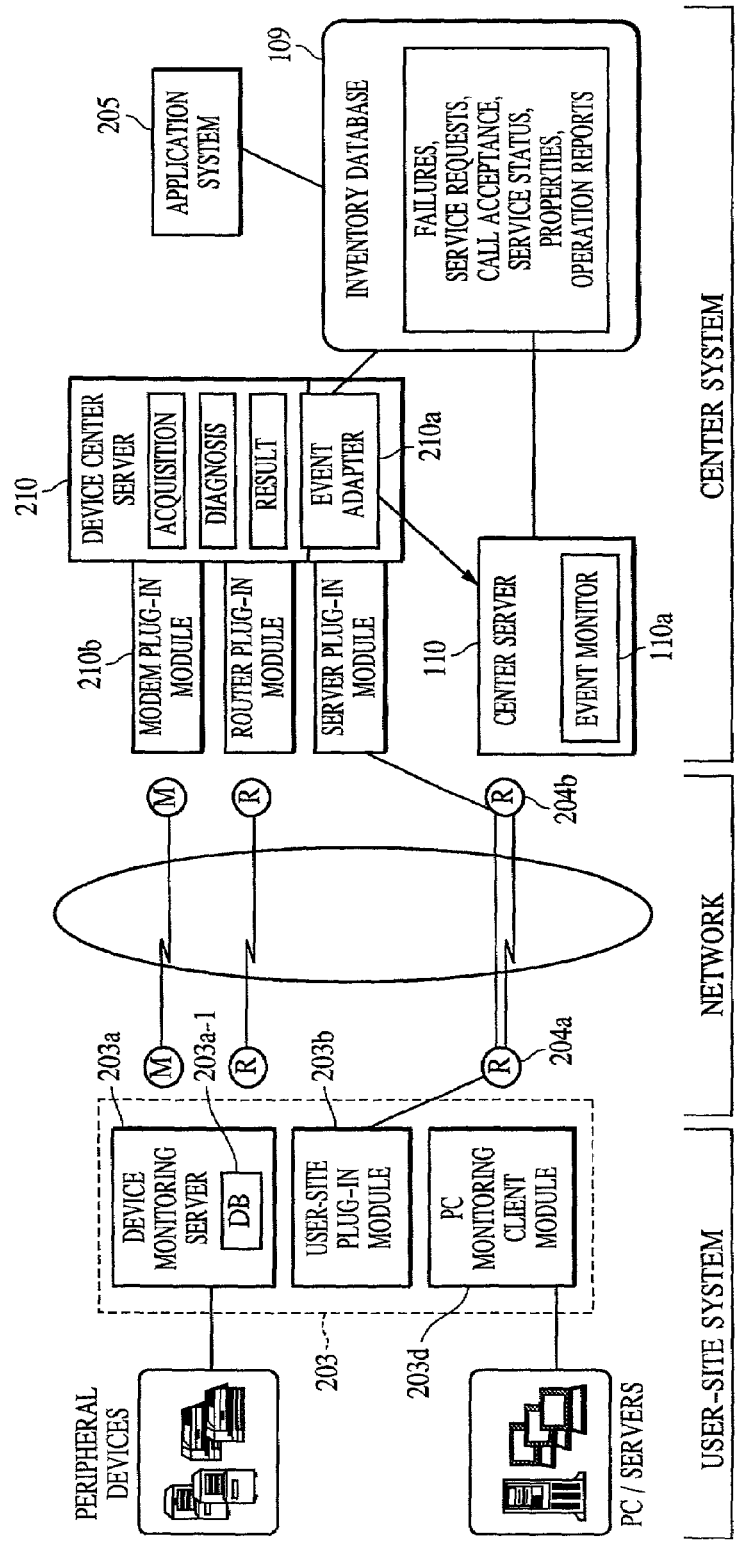
FIG. 2 is a block diagram illustrating software modules used in a remote site managing system according to an embodiment of the present invention.

FIG. 2 is a block diagram illustrating software modules in the present remote site managing system. A user-site system (managed site system) includes peripheral devices (such as a copying machine, a printer, a multifunction device, a scanner, or a facsimile machine) and PC/server devices (such as a general-purpose computer), wherein the peripheral devices are locally managed by a device monitoring server 203*a*, and the PC/server devices are locally managed by a PC monitoring client module 203*d*. The device monitoring server 203*a* and the PC monitoring client module 203*d* are generically referred to as a user-site management system 203. The device monitoring server 203*a* includes database 203*a*-1 for storing management information.

The center system (managing site system) includes a device center server 210 which communicates with the device monitoring server 203*a* and also includes a center server 110 which communicates with the PC monitoring client module 203*d*. The management information associated with the peripheral devices is stored in an inventory database 109. The management information managed by the center server 110 is also stored in the inventory database 109. The management information stored in the inventory database 109 is used by an application system 205. The inventory database 109 includes a database associated with peripheral devices and a database associated with general-purpose computers such as a PC or a server, wherein these databases are logically separated from each other. The databases may also be separated physically.

The device monitoring server 203*a* and the device center server 210 are connected to each other via a user-site plug-in module 203*b* and a server plug-in module, which serve to convert a data format or a procedure as required whereby the device monitoring server 203*a* and the device center server 210 can communicate with each other even when the operating system is different between the user site and the center. Electrically, the connection is made via a router 204. The communication line is physically or logically shared for connection between the PC monitoring client module 203*d* and the center server 110 and for connection between the user-site plug-in module and the server plug-in module.

In some cases, a line via which the device center server 210 and the device monitoring server 203*a* are connected to each other is disposed separately from a line for connecting the PC monitoring client module 203*d* and the center server to each other. In this case, the connection may be made using a communication line disposed separately from the line between the PC monitoring client module 203*d* and the center server 110.

The center server 110 includes an event monitor 110*a*. The event monitor 110*a* monitors an event issued to the center server 110 and, if an event indicating a failure is detected, the event monitor 110*a* displays the detected event on a monitor screen to inform a human manager of the event of the failure at the managed site. Such an event may be issued to the center server 110 by an event adapter 210*a*, the PC monitoring client module 203*d*, or the application system 205. Upon receiving the event, the center server 110 performs a predetermined process depending upon the content of the event. An example of such an event is a failure message.

The device center server 210 includes the event adapter module 210*a*. The event adapter 210*a* has the capability of retrieving, at scheduled intervals, information transmitted from the device monitoring server 203a to the device center server 210. From the retrieved information, the event adapter 210a detects information indicating a failure which has occurred in a peripheral device and converts the information into a format (formats of file and protocol) which can be dealt with by the center server 110. The information is transmitted, as an event indicating the occurrence of the failure, to the center server 110. Alternatively, instead of converting the information into the format which can be dealt with by the center server, the conversion may be performed by the center server 110. An event (failure event) indicating an occurrence of a failure includes information about the type of the failure, a device which has encountered the failure, and a time at which the failure occurred. By providing the event adapter module 210a in the present system, device information indicating, for example, an occurrence of a paper jam or indicating the capability of a stapling function, acquired via management software which uses a protocol or a format assumed to be used only by peripheral devices, can be managed in an unified fashion together with information acquired via software which manages other types of systems or apparatuses (such as a general-purpose computer or a server).

upon receiving the failure event, the event monitor 110a adds the failure event to an event list and displays the information about the type of the failure, the device which has encountered the failure, and the time at which the failure occurred. The information may be displayed, for example, in the form of a list of events in which one event is described in one row in the order of occurrence time. Although in the example shown in FIG. 2, the event monitor 110a is disposed in the center server 110, the event monitor 110a may be disposed outside the center server 110. In this case, the event monitor 110a is connected to the center server 110 via a network. This makes it possible for the device center server 210 or the application system 205 to comprehensively manage the peripheral devices and the PC/server devices.

Note that, regardless of where an event occurs, the event monitor 110a can display an indication of the occurrence of a failure event to inform a human manager of the occurrence of the failure. That is, the event monitor 110a displays a list of events on the monitor screen such that the list of events includes, in a time-sequential fashion, failure events issued by the PC monitoring client module 203d to indicate occurrences of failures of general-purpose computers and also includes failure events issued by the device monitoring server 203a via the event adapter 210a of the device center server 210 to indicate occurrences of failures of peripheral devices.

An example of a data transmission procedure between the device center server 210 and the device monitoring server 203a is described below with reference to FIG. 4, for the following three cases: (1) a setting value is downloaded from the device center server 210 to a device; (2) log data is uploaded from the device monitoring server 203a to the device center server 210; and (3) a request for counter data is transmitted from the device center server 210 to the device monitoring server 203a. Before describing the procedure, a data format is described briefly.

FIG. 8 illustrates an example of a format of a message transmitted between the device center server 210 and the device monitoring server 203a. Each message includes a flag field, a data type field, a job ID field, a return value field, a data length field, and a data field. The flag field includes a set of bits indicating communication means a bit indicating whether the message is in a frame at the end of data.

The data type field is used to indicate whether the message is authentication request data (transmitted at the beginning of a session), setting value data to be downloaded, a device information request which will be described later, an event information message, or a log data request. For example, in the case of a failure event message, the data type field is described so as to indicate that the message is an event information message, and the specific content of the message is described in the data field.

The job ID indicates the type of a session. More specifically, the job ID indicates whether a session is used to set a parameter, acquire device information, or transmit an event. The data length field indicates the length of data described in the data field. When a setting value is downloaded or log data is transmitted in response to a request, the data is described in the data field. In the case where count information is uploaded, device information is described in the data field of a message returned in response to a device information request.

In the procedures described below, processes are performed while transmitting messages between the device center server 210 and the device monitoring server 203a. Note that, in the following description, the term "event" is used to describe a message indicating an occurrence of an event.

Procedure of Downloading a Setting Value

Figure 4:
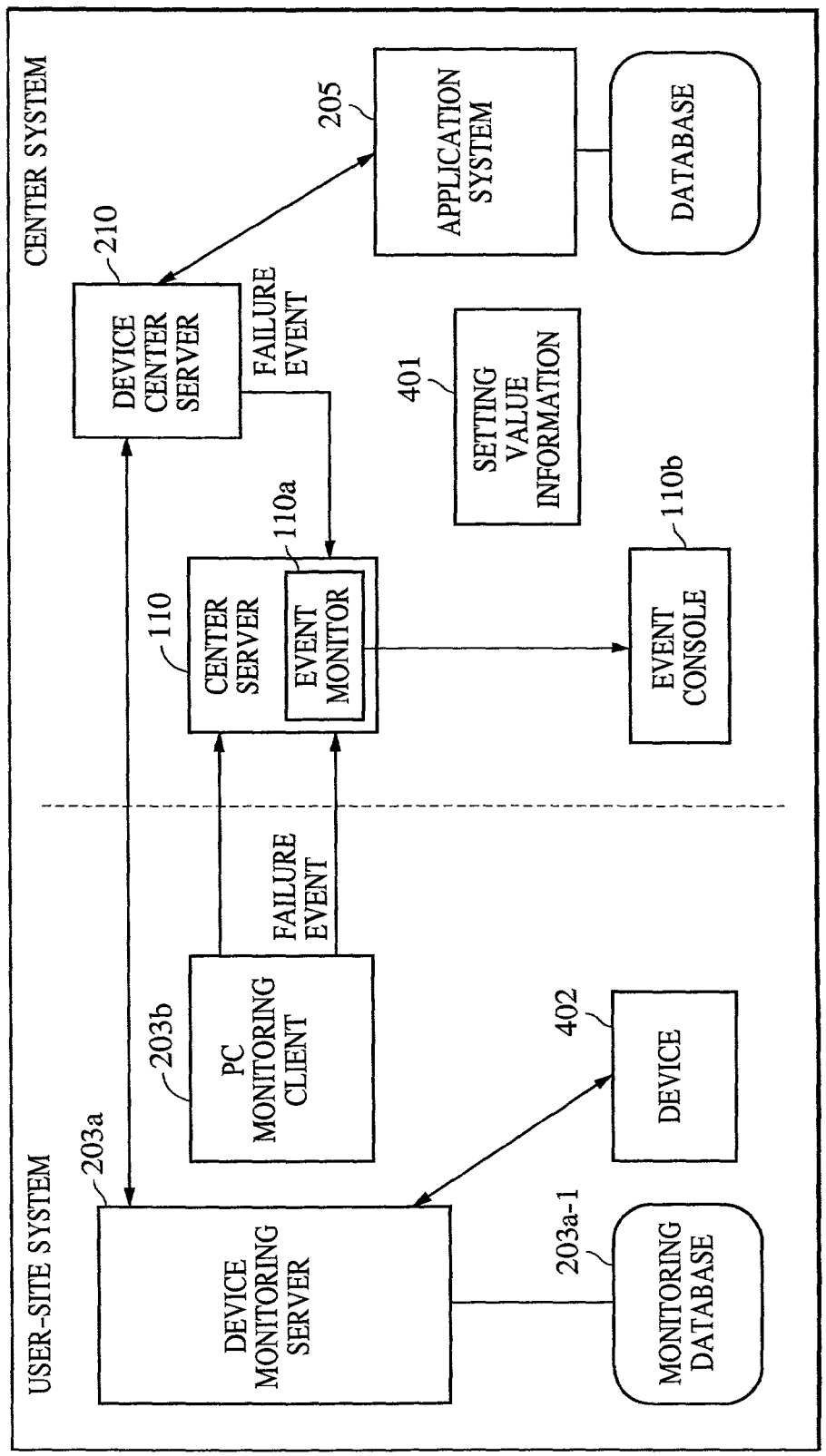
FIG. 4 is a block diagram illustrating a procedure of transmitting data between a user-site system and a center system.

FIG. 4 is a block diagram illustrating a procedure of transmitting data between the user-site system and the center system.

A setting value is downloaded as follows.

(1) In the application system 205, a setting value information file 401 is generated by inputting, for example via a manual operation, data specifying a device which is to be set, the IP address of the device, and a setting value such as a threshold value which defines a limit of a particular value such that if the value changes beyond the threshold, an alarm indicating an occurrence of an error in the device is generated to the user-site device server.

(2) The application system 205 establishes a session with the device center server 210 and transmits setting value data included in a setting value information file 401.

(3) Upon receiving the setting value data, the device center server 210 establishes a session with the device monitoring server 203a and transfers the setting value data to the device monitoring server 203a.

(4) Upon receiving the setting value data, the device monitoring server 203a transmits the setting value to device in accordance with a predetermined procedure depending upon the device.

(5) After completion of setting the device, the device monitoring server 203a transmits a message to the device center server 210 to inform that the setting of the device has been completed.

(6) The device center server 210 transmits a setting completion message to the application system 205.

Thereafter, the application system 205 releases the session with the device center server 210, and the device center server 210 releases the session with the device monitoring server 203a.

As described above, the device setting information is downloaded to the device 402 via direct communication between the device monitoring server 203a and the device center server 210.

On the other hand, a message indicating an occurrence of a failure is transmitted as follows.

(7) When the PC monitoring client module 203d detects a failure in some server or a PC, the PC monitoring client module 203d issues a failure event directly to the center server 110.

(8) In the case where a failure of the device 402 is detected by the device monitoring server 203a, the device monitoring server 203a transmits a failure message to the device center server 210.

(9) Upon receiving the message indicating the occurrence of the failure in the device 402, the device center server 210 issues an event to inform the center server 110 of the occurrence of the failure. In the example shown in FIG. 4, the device center server 210 includes an event adapter 201a shown in FIG. 2, and thus the failure event is issued by the event adapter 201a.

(10) When the event monitor 110a detects the failure event, the event monitor 110a displays the failure information on an event console and updates the event list.

As described above, the event indicating the occurrence of the failure is passed through the center server 110 regardless of whether the failure occurs in some peripheral or some general computer at the managed site, and thus a human manager can monitor the information associated with all peripheral devices and general-purpose computers at the managed site simply by watching the event console of the center server. The information displayed on the event console may be printed or displayed on a portable terminal carried by a service person. The printed information may be sent by mail to a user. In response to the information displayed on the portable terminal of the service person, the service person may go to the user site. Thus, the information about the peripheral devices and the PC/servers, managed in the unified fashion, can be used for various purposes.

In the above description, a failure of a peripheral device is displayed on the event console 110b via the event monitor 110a shown in FIG. 4. However, in the present invention, all failures of peripheral devices are not displayed on the event console 110b. That is, when a failure occurs in a peripheral device, it is determined whether or not a failure event should be transmitted to the device center server 210 on the basis of the level of the failure.

For example, in the case of an error from which it is possible to recover simply by resetting a device or turning on/off the device, such as an open-door error in a copying machine, a message indicating the occurrence of the error is not transmitted from the device monitoring server 203a to the device center server 210. On the other hand, when the center server receives a message indicating an error which can be easily corrected by a customer, such as a paper jam or a temperature increase which will not cause a significant failure, a service person is not sent to the customer.

If the database used to determine whether or not a message indicating a failure should be sent to the center server is stored in one of devices such as the monitoring database 203a-1 or the device 402 disposed at the managed site, it is possible to determine, at the managed site, whether information should be transmitted from the managed site to the managing site.

On the other hand, the database used to determine whether or not failure information received by the center server 110 should be displayed on the event console 110b or to determine whether or not failure information should be sent to a service person, may be stored in the application system 209, the inventory database 109, or the center server 110, disposed at the center server site.

As described above, because the present system has the capability of filtering information to be transmitted, the volume of communication traffic between the user site and the center site can be reduced. In addition, this arrangement allows a human manager at the center site to easily and surely detect a significant error.

Procedure of Uploading Count Information

Uploading of a count value, that is, acquisition of device information, is performed as follows. Herein, the count value refers to a value indicating the number of pages printed by a copying machine or a printer, or a mode counter value indicating the number of times that a device has been used in a particular mode. The fee for the maintenance is determined on the basis of the count value. By uploading the count value in response to a request issued by the center system, it becomes possible to acquire the count value or other device information from a remote site. The uploading of count information is initiated in response to a request issued by the application, and thus the center system (managing site) serves as an initiator.

(1) The application system 205 establishes a session and transmits a device information request to the device center server 210. The device information request includes information specifying a device at the user site.

(2) Upon receiving the device information request, the device center server 210 establishes a session with the device monitoring server 203a and transmits the device information request to the device monitoring server 203a.

(3) Upon receiving the device information request, the device monitoring server 203a acquires device information from the specified device. The above process is performed in accordance with a predetermined procedure depending upon the device, wherein the information is specified for each device.

(4) If the device information has been acquired, the device monitoring server 203a transmits a device information response including the acquired device information to the device center server 210.

(5) The device center server 210 transfers the device information response to the application system 205.

Thereafter, the application system 205 releases the session with the device center server 210, and the device center server 210 releases the session with the device monitoring server 203a.

As described above, the device information can be acquired via direct communication between the device monitoring server 203a and the device center server 210.

A failure event can be transmitted in a similar manner to the downloading of a setting value.

Procedure of Uploading Log Data

Uploading of log data is performed as follows. Log data refers to data indicating the history of alarms or retries which have generated or performed in a peripheral device. Even when an error is not detected, if alarms have been generated a greater number of times than a predetermined number, the device is regarded as being in an abnormal status, and the managing site is informed of the status. Therefore, in the uploading of log data, unlike the uploading of a counter value, the managed site system (user site system) is an initiator.

(1) The device monitoring server 203d describes the log data associated with devices. If the data size of the log data becomes greater than a predetermined value, or if alarms are generated at a rate greater than a predetermined value, the device monitoring server 203a uploads the log data.

(2) The device monitoring server 203a establishes a session and transmits a log data processing request including log data to the device center server 210.

(3) Upon receiving the log data processing request, the device monitoring server 203*a* establishes a session with the device center server 210 and transmits the log processing request to the device center server 210.

(4) Upon receiving the log data processing request, the device center server 210 establishes a session with the application system 205 and transmits the log data processing request to the application system 205 which is assigned to process the log data.

(5) Upon receiving the log data processing request, the application system 205 processes the log data received together with the log data processing request. After completion of processing the log data, the application system 205 transmits a log data processing response to the device center server 210.

(6) The device center server 210 transfers the log data processing response to the device monitoring server 203*a*.

(7) The device monitoring server 203*a* releases the session with the device center server 210 and performs post-processing. In the post-processing, if the log data processing response indicates that the processing of the log data has been successfully completed, the log data is deleted.

Thereafter, the device center server 210 releases the session with the application system 205.

As described above, log information can be uploaded via direct communication between the device monitoring server 203*a* and the device center server 210.

A failure event can be transmitted in a similar manner to the downloading of a setting value.

Procedure Performed by the Device Center Server

Figure 5:
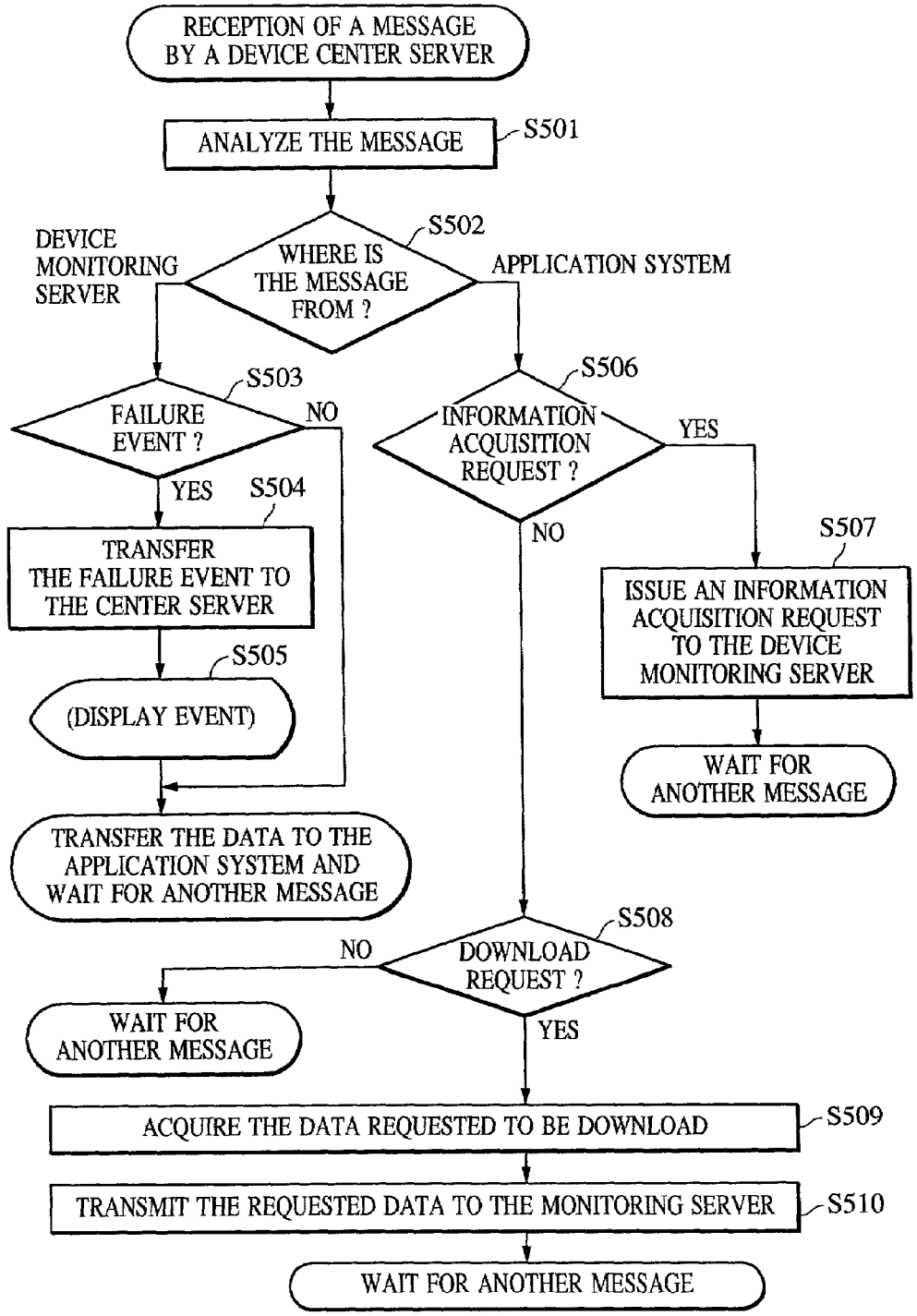
FIG. 5 is flow chart illustrating a process which is performed by the device center in response to a receiving a message.

The processes performed by the device center server 210 and the device monitoring server 203*a* are briefly described below. FIG. 5 is a flow chart illustrating a process which is performed by the device center server when the device center server receives a message. The message is not necessarily from the device monitoring server but may be from the application system 205. The format of the message may be different from the format shown in FIG. 8. In any case, the issuer of the message can be identified or the process is performed differently depending upon the issuer of the message. In the present embodiment, it is assumed that the issuer of the message can be identified.

When a message is received, the process shown in FIG. 5 is started. First, the received message is analyzed (step S501) to determine which device has issued the message (step S502). The issuer may be indicated by adding its address to the message. Alternatively, the issuer may be determined on the basis of the content of the message. For example, if the message is a log data processing request, the issuer must be the device monitoring server. If the message is a request for downloading a setting value, the issuer must be the application system (represented as the back-end system in the flow chart).

In the case where the message has been issued by the device monitoring server 203*a*, it is determined whether or not the message is a failure event (step S503). If the message is a failure event, the message is transferred to the center server 110 after being converted into a format which can be dealt with by the center server 110 (step S504). The center server 110 detects the type of the failure and the location and the time of the failure from the message and displays them (step S505). In the case where the message is not a failure event, the message is transferred to the application system which in turns performs a process in accordance with the message. Thereafter, the process waits for another message.

Examples of processes transferred to the application system include a log data processing request and acquired device information.

In the case where the message has been issued by the application system, it is determined whether or not the message is a device information acquisition request (step S506). If yes, the device information acquisition request is transmitted to the device monitoring server 203*a* and the process waits for another message.

If the message is not a device information acquisition request, it is determined whether the message is a request for downloading a setting value (step S508). If the message is a download request, the data requested to be downloaded is acquired (step S509), and the acquired data is transmitted to the device monitoring server 203*a* (S510).

Procedure Performed by the Device Monitoring Server

Figure 6:
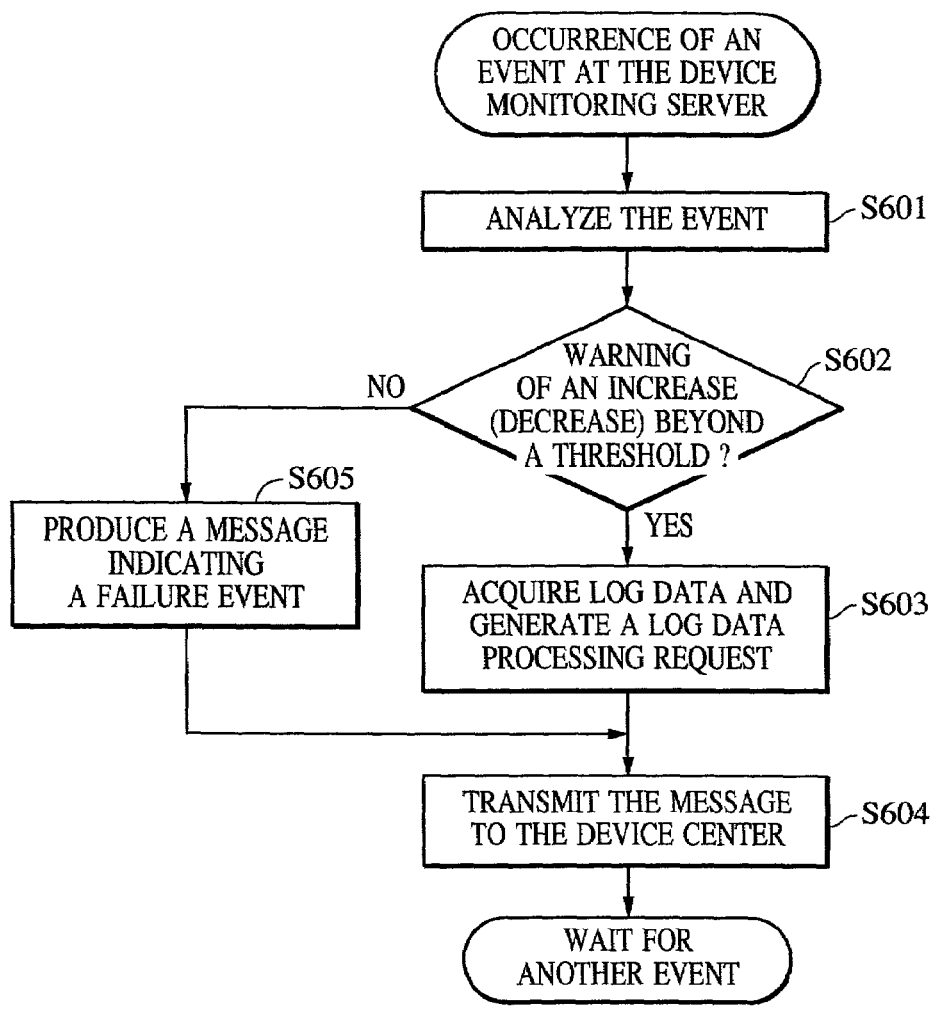

FIG. 6 is a flow chart illustrating a process performed in response to an occurrence of an event in the device monitoring server 203*a*.

If an event occurs, the event is analyzed (step S601). If the event is a warning, and if the number of warnings has reached a value greater than a predetermined threshold (S602), the log data which has been stored is acquired, and a message indicating a request for processing log data is created (step S603) and transmitted to the device center server 210. However, if the threshold value has not been reached, the warning is described in the log data.

If the event is not a warning, it is determined that an error has occurred, and a message indicating a failure event is generated (step S605). In step S604, the message is transmitted to the device center server 210.

Figure 7:
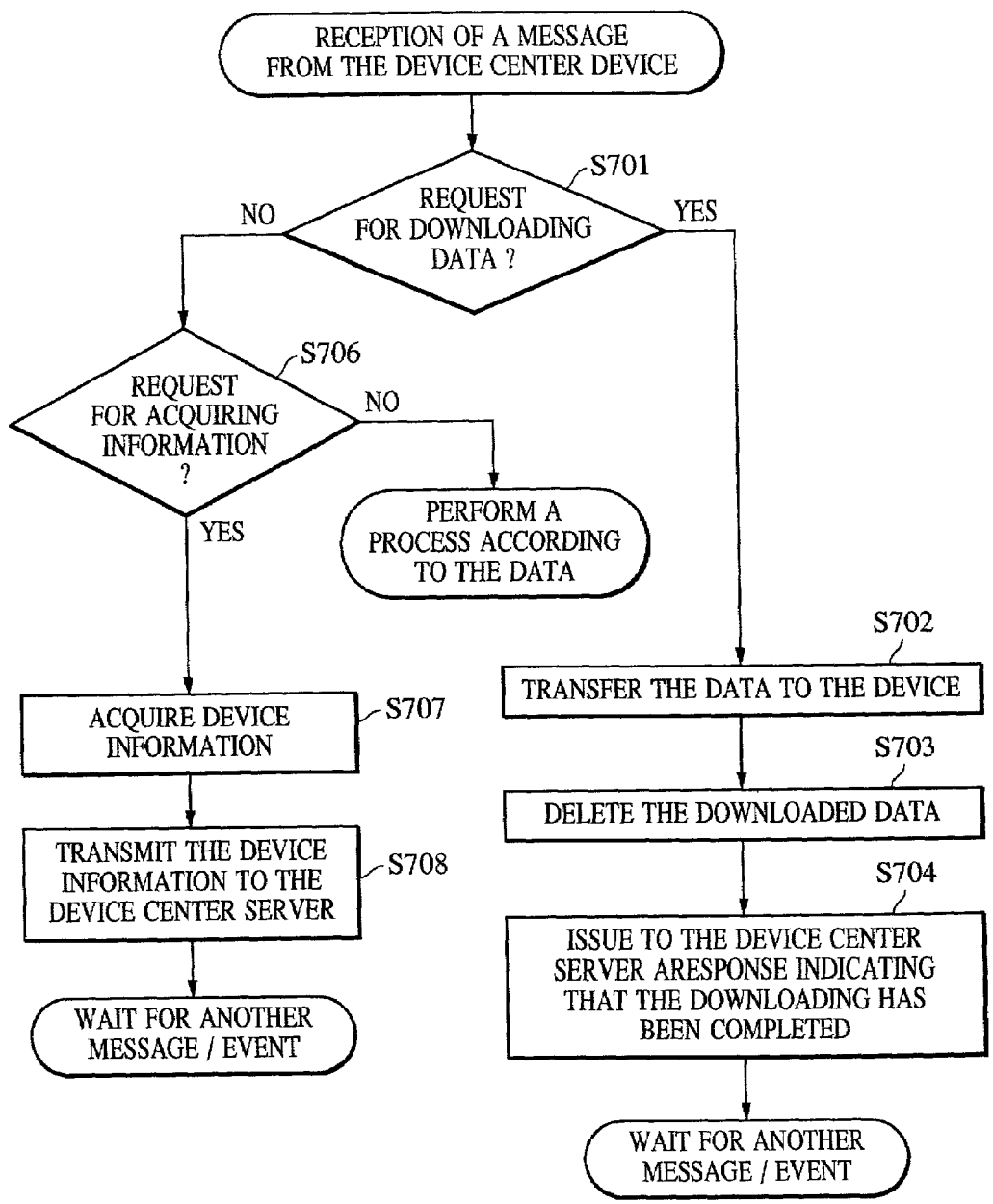
FIG. 7 is a flow chart of a process performed by the device monitoring server 203a in response to receiving a message from the device center server 210.

FIG. 7 is a flow chart illustrating a process performed by the device monitoring server 203*a* in response to receiving a message from the device center server 210.

First, it is determined whether or not the received message is a request for downloading a setting value (step S701). If the received message is a download request, setting is performed by the device monitoring server 203*a* and the device in accordance with received setting data (step S702). Thereafter, the user-site plug-in module 203*b* deletes the data (step S703) and transmits, to the device center server 210, a message indicating that the downloading has been completed (step S704). Note that the user-site plug-in module 203*b* is required to logically connected to the device monitoring server 203*a*, but it is not necessarily required to be physically connected.

In the case where the message it not a download request, it is determined whether or not the message is a device information acquisition request (step S706). If the message is a device information acquisition request, information is acquired from a specified device (step S707), and the acquired information is transmitted to the device center server (step S708).

The above-described procedure makes it possible to integrate the system for managing general-purpose computers and the system for managing peripheral devices into a single managing system thereby making it possible to manage failure events in the unified fashion. The present invention is not limited to a system in which managing information associated with peripheral devices is adapted to the software designed to manage PC/servers, but the present invention may also be applied to a system in which management information associated with PC/servers is adapted to the software for managing peripheral devices. For example, the event adapter module 210*a* shown in FIG. 2 may be installed in the center server 110 and an event generated by a device server may be transmitted to the device center server 210.

As in the example shown in FIG. 2, the same line may be used in common via a router or the like for communication between the device monitoring server 203a and the device center server 201 and for communication between the PC monitoring client module 203d and the center server 110. This allows a reduction in the total number of communication lines. This is useful in particular when private lines are employed.

Second Embodiment of a Remote Site Managing System

Referring to the drawings, a second embodiment of a remote site managing system according to the present invention is described below. The second embodiment of the system differs from the first embodiment in the manner in which logical channels are formed between the managing site and the managed site. In the first embodiment, although a communication line is shared, the channel used for communication between the device monitoring server 203a and the device center server 210 is logically independent of the channel for communication between the PC monitoring client module 203d and the center server 110. When the device center server 210 receives a message indicating a failure event from the device monitoring server 203a, the message indicating the failure event is transferred to the center server 110 so that failure events are managed by the event monitor in the unified fashion.

In contrast, in the present embodiment, there is neither the device center server 210 nor the channel for communication between the device center server 210 and the device monitoring server 203a. Instead of the device center server, a device information processing module 901 is disposed in the center server 110 (they are disposed in a separate fashion in the example shown in FIG. 9) to process information associated with a peripheral device received by the center server 110. In this configuration, when a commercially available PC monitoring client module 203d and center server 110 are employed, a message associated with a peripheral device is also transmitted via a channel established between them. This provides, in addition to the advantage that the line can be shared as in the first embodiment, another advantage that it is not required to establish an independent communication channel for transmitting information associated with a peripheral device, and it is not required to separately provide a device center server.

System Configuration

Figure 9:
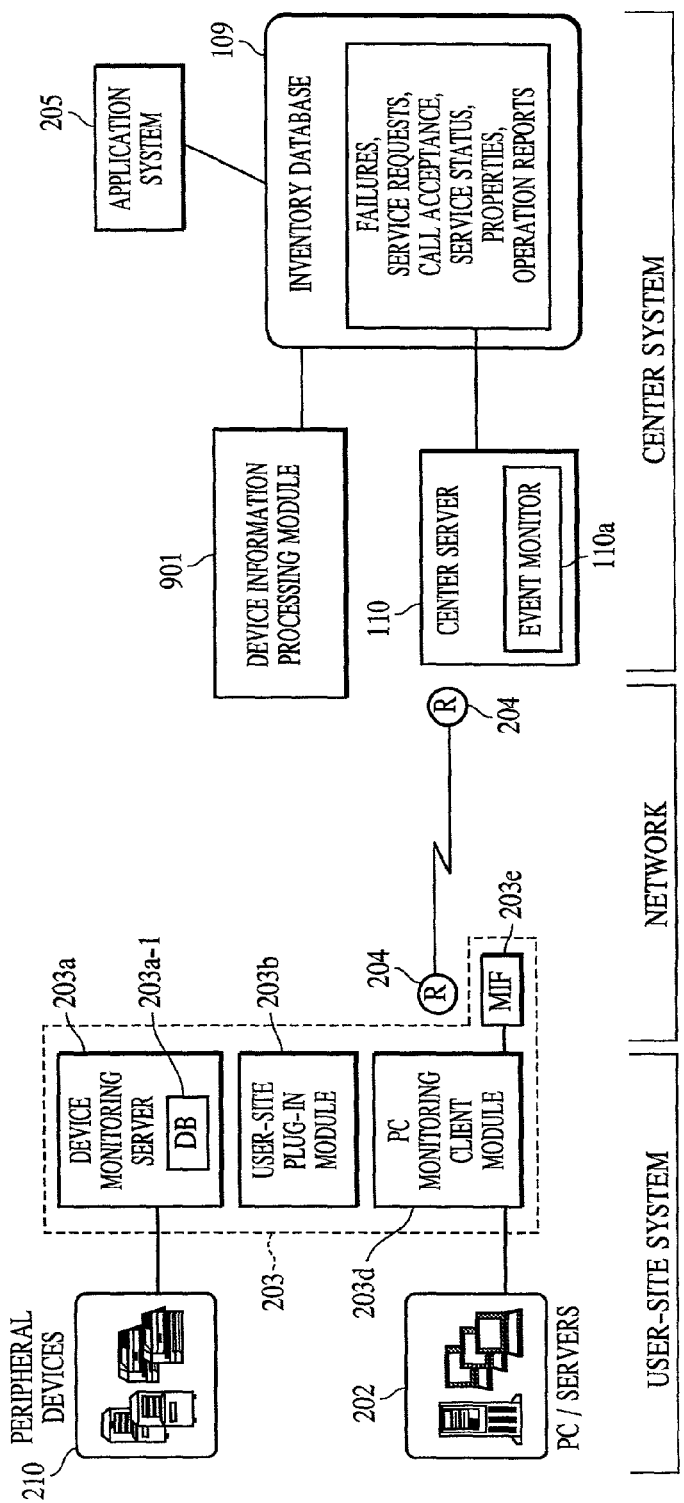
FIG. 9 is a block diagram illustrating software modules used in a remote site managing system according to an embodiment of the present invention.

FIG. 9 is a block diagram illustrating software modules in the remote site managing system according to the present embodiment. The user site system (managed site system) includes peripheral devices (such as a printer, a copying machine, a scanner, a facsimile machine, a multifunction device, etc.) and PC/server devices (such as a general-purpose computer), the peripheral devices are managed by a device monitoring server 203a, and the PC/server devices are managed by a PC monitoring client module 203d, as in the first embodiment described above.

The center system (managing site system) includes a device information processing module 901 which communicates with the device monitoring server 203a, and a center server 110 which communicates with the PC monitoring client module 203d. Management information associated with the peripheral devices and that associated with PC/servers are stored in an inventory database 109. Although in FIG. 9 the inventory database 109 has a single form, the inventory database 109 includes, in practice, a database associated with peripheral devices and a database associated with purpose-purpose computers such as a PC or a server, wherein these databases are logically separated from each other. The databases may be separated physically as well. The information stored in the database 109 is used by the application system 205, the center server 110, and other devices, as in the first embodiment.

The managed site and the managing site are connected to each other via a communication line extending between routers 204 disposed at the respective sites. The PC monitoring client module 203d and the center server 110 may be realized using a commercially available site management system. Any message is transmitted or received via a channel established between the PC monitoring client module 203d and the center server 110 provided by the commercially available management system. Although in the example shown in FIG. 9, the device information processing module 901 (corresponding to the device center server 210 in the system shown in FIG. 2) is provided in a separate fashion, the device information processing module 901 may be incorporated in the center server 110.

The device monitoring server 203a and the PC monitoring client module 203d are connected to each other via a user-site plug-in module 203b for converting a data format or a communication protocol as required. That is, the user-site plug-in module 203b has the capability of converting information transmitted from the device monitoring server into a format (or protocol) which can be dealt with by the PC monitoring client module 203a, and the user-site plug-in module 203b also has the capability of performing an inverse conversion. Alternatively, the function of the use-site plug-in module 203b may be incorporated into a plug-in module (corresponding to the server plug-in module shown in FIG. 2) provided, in the center site, for transferring data between the center server 110 and the device processing module 901.

As will be described in detail later, the user-site plug-in module 203b transfers a message received from the device monitoring server 203a to the PC monitoring client module 203d to transmit it to a specified destination. The user-site plug-in module 203b also periodically checks, by means of polling, the contents in a predetermined storage area assigned as an area in which a message is written by the PC monitoring client module 203d. If there is a message to be transmitted to the device monitoring server 203a, the user-site plug-in module 203b transfers the message to the device monitoring server 203a.

The center server 110 deals with the received message differently depending upon the content of the message. That is, if the content of the message is associated with a peripheral device, the center server 110 transfers the message to the device information processing module to process it. In the case where the received message is a message indicating an occurrence of an event, the center server 110 converts the event data into a format which can be dealt with by the event monitor 110a to determine whether the event is associated with a peripheral device or a PC/server and the event is displayed in the form of an event list. In the case of an event associated with a peripheral device, the event is generated by the device information processing module 901.

As described above, by providing the plug-in module having the capability of converting data into formats suitable for being dealt with by the peripheral devices and the PC/servers, it becomes possible to transmit information associated with a peripheral device between the user site and the managing site, and the information can be managed using the functions of the commercially available PC/server management software. In the case of special device information which cannot be managed by the commercially available PC/server management software, the data indicating device information is converted, at the center site, from a format for use by the PC/server devices into a format for use by the peripheral device, and the resultant data is dealt with by the device information processing module. When it is desired to manage device information in a special manner, the purpose can be achieved by modifying only the device information processing module. This allows the system to be designed and developed in an efficient manner.

An example of a data transmission procedure between the user-site system (managed site) and the center system (managing site) is described below with reference to FIGS. 10 to 14, for the following three cases: (1) a setting value is downloaded from the device center server 210 to a device; (2) log data is uploaded from the device monitoring server 203a to the device center server 210; and (3) a request for counter data is transmitted from the device center server 210 to the device monitoring server 203a.

Procedure of Downloading a Setting Value

Figure 10:
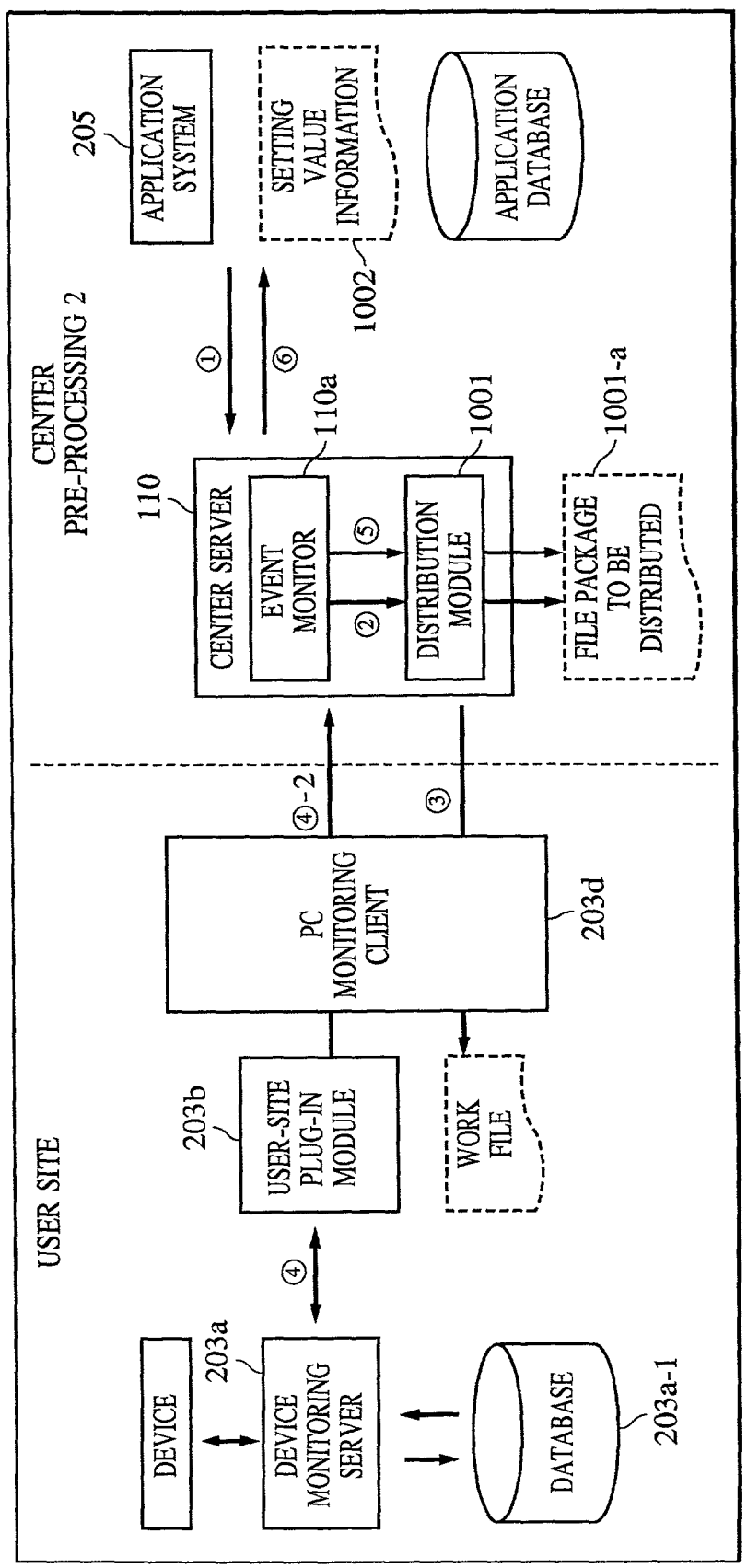
FIG. 10 is a diagram illustrating a process performed by a user-site system and a center system to download a setting value associated with a device.

FIG. 10 is a block diagram illustrating a process performed by the user-site system and the center system to download a setting value associated with a device. A setting value is downloaded as follows.

In the application system 205, a setting value information file 1002 is generated by inputting, for example via a manual operation, data specifying a device which is to be set and a setting value.

(1) The application system 205 establishes a session with the center server 110.

(2) In the center server 110, a distribution module 1001 is activated to produce a distribution file package 1001a from a setting value information file 1002.

(3) The distribution module 1001a transmits the distribution package file to the PC monitoring client module 203d. The PC monitoring client module 203d stores the received distribution package file as a work file.

(4) The user-site plug-in module 203b examines, in scheduled intervals, the data file stored in the PC monitoring client module 203d. If the user-site plug-in module 203b detects that a work file is generated by the PC monitoring client module, the user-site plug-in module 203b informs the device monitoring server of the arrival of a setting value and the user-site plug-in module 203b transfers the setting value to the device monitoring server 203a. The device monitoring server 203a sets the setting value in a specified device.

(4-2) The user-site plug-in module 203b transmits a message indicating the completion of the setting process to the center server via the PC monitoring client module 203d.

(5) The center server 110 deletes the distribution package file 1001a via the distribution module 1001.

(6) The center server 110 informs the application system 205 of the completion of the setting operation.

As described above, setting information associated with a device can be downloaded by transferring setting data to the device monitoring server 203a.

Information indicating an occurrence of a failure in some peripheral device is transmitted as a failure event from the user-site plug-in module 203b to the center server 110 via the PC monitoring client module 203d in a similar manner to the procedure (4-2) described above. Thus, an event indicating a failure is dealt with by the event monitor 110a in the center server 110 and displayed in the form of the event list.

Procedure of Uploading Count Information

Figure 11:
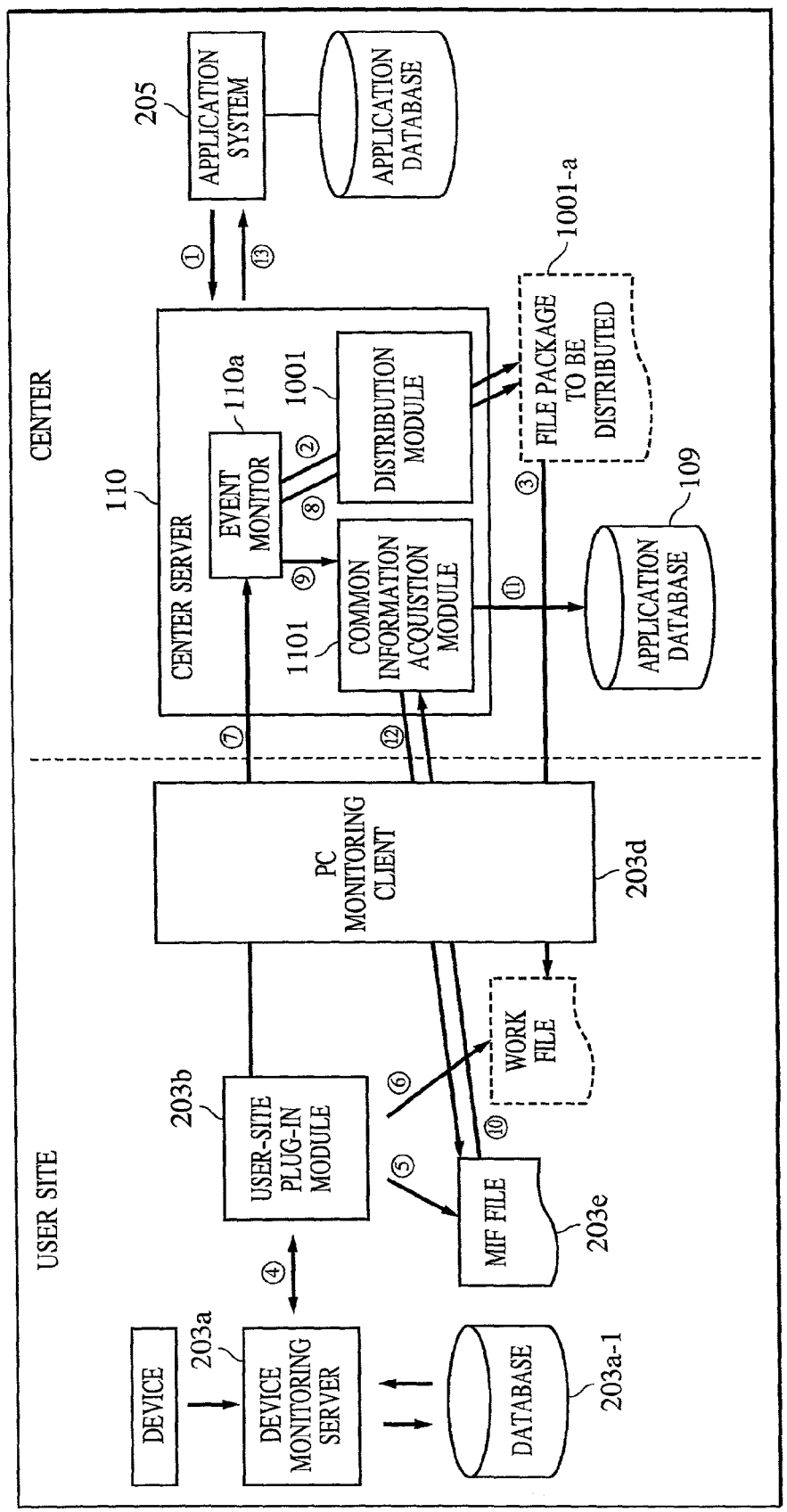
FIG. 11 is a diagram illustrating a process performed between the user-site system and the center system to acquire information about a device, for example, to update count data.

FIG. 11 is a diagram illustrating a process performed between the user-site system and the center system to acquire information about a device, for example, to update count data. Device information is uploaded as follows.

(1) The application system 205 stores an information request command in a file and issues a message (event) which causes the center server 110 to acquire information.

(2) The event monitor analyzes the event received from the application system 205 and activates the distribution module 1001 to generate a distribution file package 1001 in response to the information request command.

(3) The center server 110 transmits the distribution package including the information request command to the PC monitoring client module 203d. The PC monitoring server 203d stores the received file as a work file. Herein, the term "work file" refers to a general-purpose file used in the PC/server management system and includes the same content as that of the distribution file package 1001a.

(4) If the user-site plug-in module 203b detects that the PC monitoring server 203d has stored the file, the user-site plug-in module 203b reads the file and transfers it to the device monitoring server 203a. In response to the receiving the file, the device monitoring server 203a acquires device information from a specified peripheral device and the returns the acquired device information to the user-site plug-in module 203d.

(5) The user-site plug-in module 203b stores the received device information in a file 203e in a predetermined format. In the present embodiment, an MIF format, which is widely used in information management systems, is employed as the format of the file 203e.

(6) The user-site plug-in module 203b deletes the work file.

(7) The user-site plug-in module 203b generates an event indicating that the MIF file has been created and transmits the event to the center server 110.

(8) In response to the receiving the event, the center server 110 deletes the distribution file package.

(9) In the case where the event received from the user-site plug-in module 203b indicates that the acquisition of information has been successfully completed, the center server 110 activates the common information acquisition module 1102 to read the MIF file generated by the user-site plug-in module 203b thereby acquiring the device information

(10) The common information acquisition module 1101 reads the MIF file 203e to acquire the device information.

(11) The common information acquisition module 1101 stores the acquired device information in an inventory database. The inventory database includes physically or logically separated databases one of which is for peripheral devices and the other is for PC/servers, so that a process can be properly performed depending upon the device.

(12) The center server then makes the MIF file 203 at the user site removed.

(13) The center server informs the application of the completion of the process.

In the above-described manner, the device information acquired by the device monitoring server 203a can be transferred to the center server 110.

Procedure of Uploading Log Data

Figure 12:
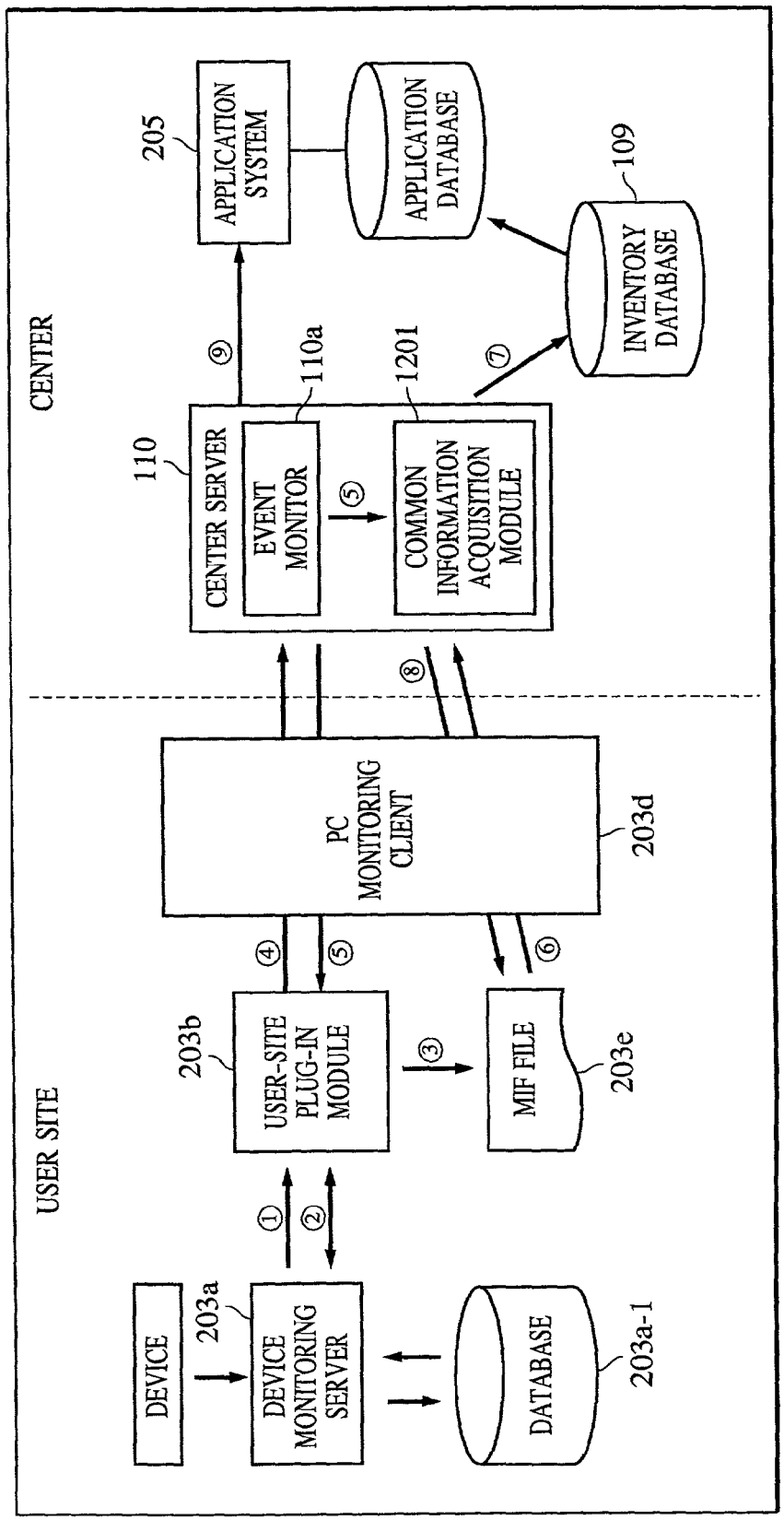
FIG. 12 is diagram illustrating a process of uploading log data from the user-site system to the center system.

FIG. 12 is diagram illustrating a process of uploading log data from the user-site system to the center system. In the present embodiment, the uploading of log data is performed as follows.

(1) The device monitoring server 203*a* transmits, to the user-site plug-in module 203*b*, a message indicating that an error or a warning has been detected or indicating that errors or warnings have been detected a greater number of times than a predetermined threshold value.

(2) The device monitoring server 203*a* issues the above-described warning event to the user-site plug-in module 203*d*.

(3) The user-site plug-in module 203*b* stores the log data in a file 203*e* in the MIF format. As described earlier, the MIF format is a data/file format which is widely used in information management systems.

(4) The user-site plug-in module 203*b* generates an event indicating that the MIF file has been generated and transmits it to the center server 110.

(5) Upon receiving the event, the center server 110 activates the common information acquisition module 1201.

(6) The common information acquisition module 1201 acquires the log data by reading the MIF file 203*e* generated by the user-site plug-in module 203*b*.

(7) The common information acquisition module 1101 stores the acquired device information in the inventory database 109.

(8) The center server makes the MIF file 203*e* at the user site deleted.

(9) The center server informs the application of the completion of the process.

In the above-described manner, the log data file generated by the device monitoring server 203*a* is acquired by the center server 110.

Procedure Performed by the Device Center Server

Figure 13:
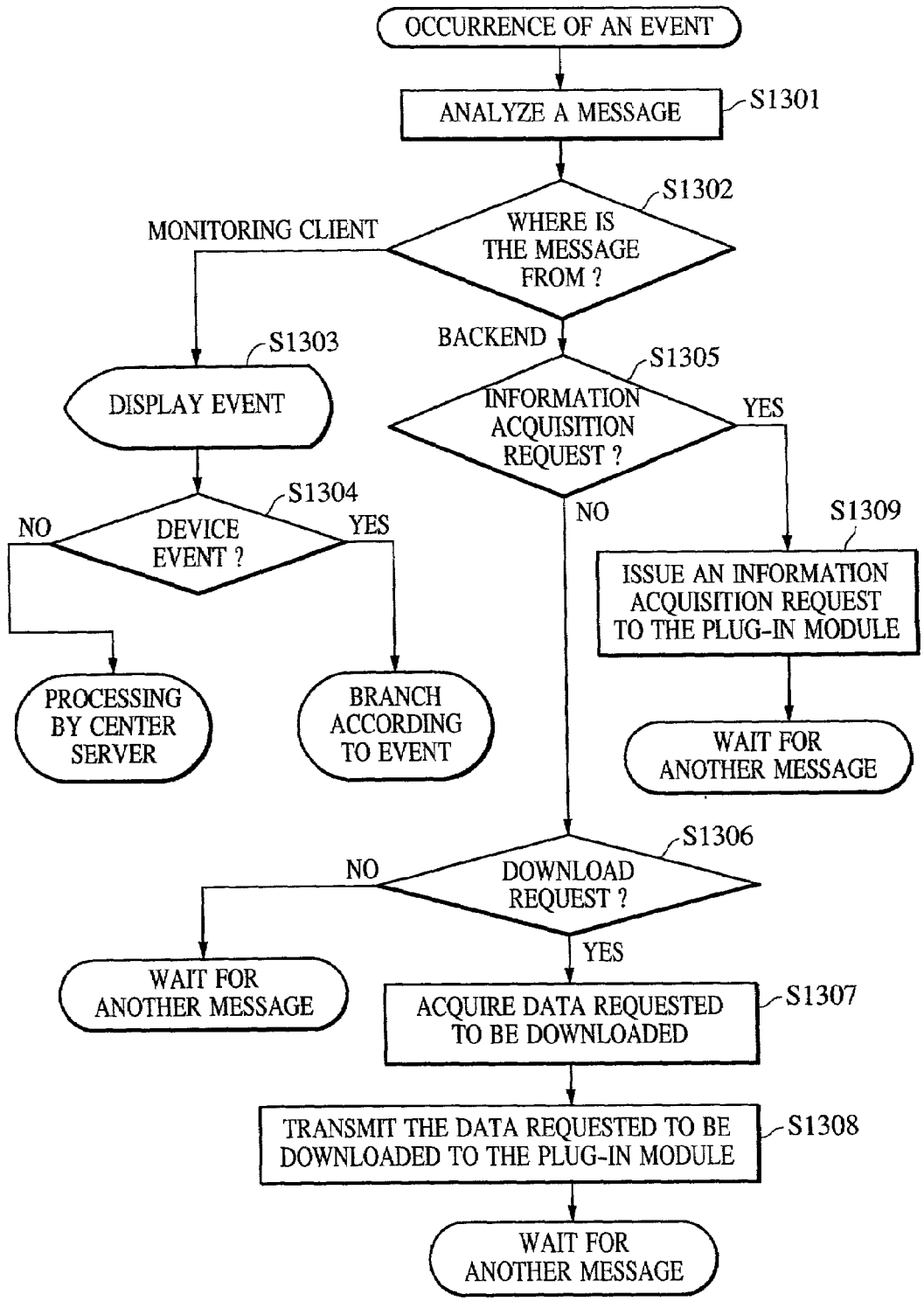
FIG. 13 is a flow chart of a process performed by the center server 110 in response to receiving an event.

The processes performed by the center server 110, the device information processing module 901, the user-site plug-in module 203*b*, and the PC monitoring client module 203*d* are briefly described below. FIG. 13 is a flow chart of a process performed by the center server 110 in response to receiving an event. In response to receiving an event, the process shown in FIG. 13 is started. Note that the terms "message" and "event" are not distinguished strictly. That is, the term "event" is used to describe a message indicating an occurrence of an event.

First, the received event is analyzed (step S1310) to determine where the event is from (step S1302). If the event has been issued by the PC monitoring client module 203*d*, the event is dealt with by the event monitor. However, if the event is a failure event, the event is displayed in the form of an event list (step S1303).

Thereafter, it is determined whether or not the event is associated with a peripheral device, that is, whether or not the event has been issued by the user-site plug-in module 203*b* (step S1034). If the event is associated with a peripheral device, the device information processing module performs a process depending upon the event. The detailed procedure is described in FIGS. 14 to 16. On the other hand, if the event is not associated with any peripheral device, the event is dealt with by the center server 110.

In the case where the event has been issued by a back-end system, that is, an application system, it is determined whether the event is a request for acquiring information (step S1305). If yes, an information acquisition request is issued to the user-site plug-in module 203*b* (step S1039). The information acquisition request is issued by generating a distribution file package using the distribution module 1001.

If the event is not a request for acquiring information, it is determined whether the event is a request for downloading data (step S1306). If no, a process is performed depending upon the event, and the process waits for another event.

In the case where the event is a request for downloading data, data requested to be downloaded is acquired from the back-end system (step S1037), and the download data is transmitted to the user-site plug-in module 203*b* (step S1308).

Procedure Performed by the Device Information Processing Module

In the case where it is determined in step S1304 in FIG. 13 that the event is associated with a peripheral device, the event is analyzed to further determine whether (1) the event is a notice of completion of downloading, (2) the event is a notice of completion of acquisition of device information, or (3) the event is a request for uploading log data. The details of these processes are illustrated in the flow chart shown in FIGS. 14 to 16.

Completion of Downloading

Figure 14:
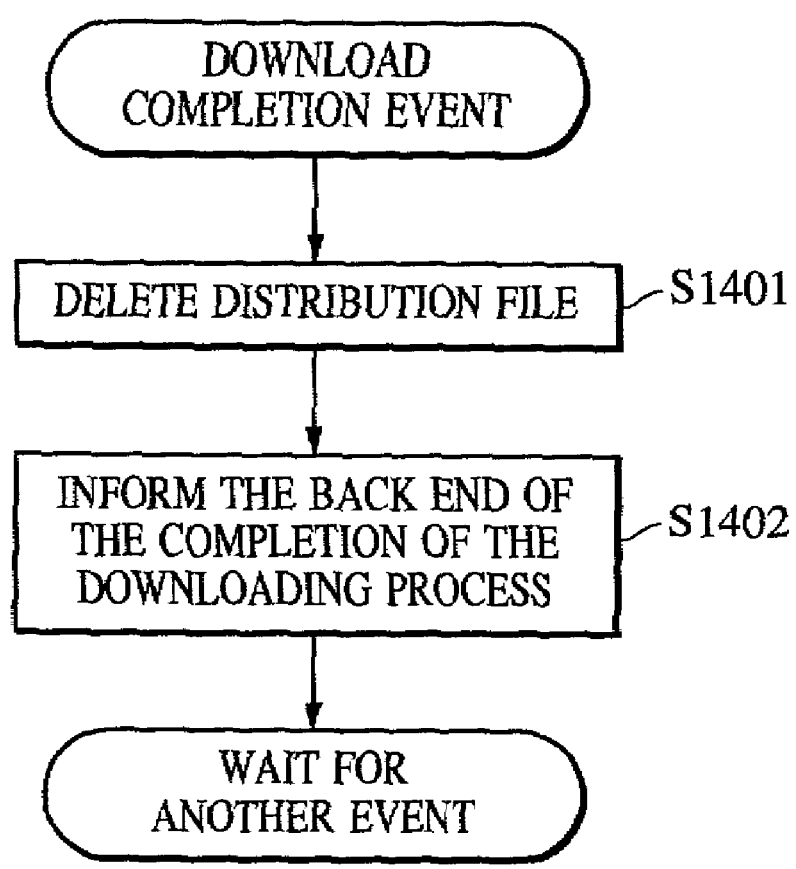
FIG. 14 is a flow chart of a process performed by a device information processing module 901 in response to an event indicating completion of downloading.

FIG. 14 is a flow chart of a process performed by a device information processing module 901 in response to a download end event. If a notice of completion of downloading is received, the distribution file package 1001*a* is deleted (step S1401), and the back-end system is notified of the completion of downloading (step S1402).

Acquisition of Device Information

Figure 15:
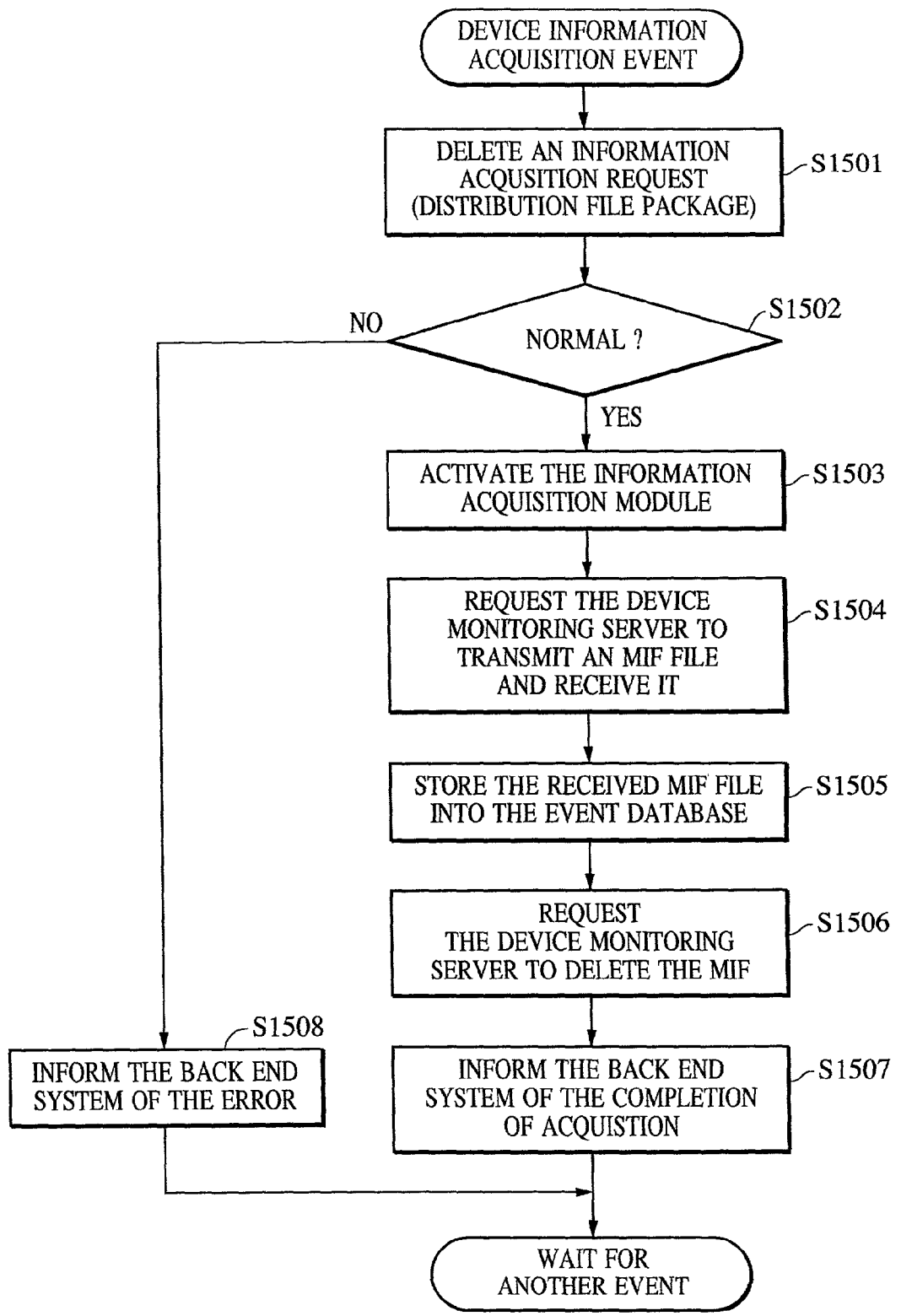
FIG. 15 is a flow chart of a process performed by the device information processing module 901 in response to notification of acquisition of device information (counter value).

FIG. 15 is a flow chart of a process performed by the device information processing module 901 in response to notification of acquisition of device information (counter value).

First, the distribution file package 1001*a* generated in response to the information acquisition request is deleted (step S1501). Thereafter, if the data has been successfully acquired, the information acquisition module 1101 is activated (step S1503), and a request for an MIF file in which device information is stored is issued to the device monitoring server 203*a*. As a response to the request, the MIF file is received (step S1504).

The received file is stored in the inventory database 109 (step S1505), and a request for deleting the MIF file is transmitted to the device monitoring server 203*a* (step S1506). Finally, the back-end system is informed of the completion of acquisition of the device information (step S1507).

On the other hand, in the case where an error is detected in step S1502, the back-end system is informed of the error (step S1508).

In the above-described manner, the device information described in the MIF file is acquired from the device monitoring server 203*a*.

Uploading of Log Data

Figure 16:
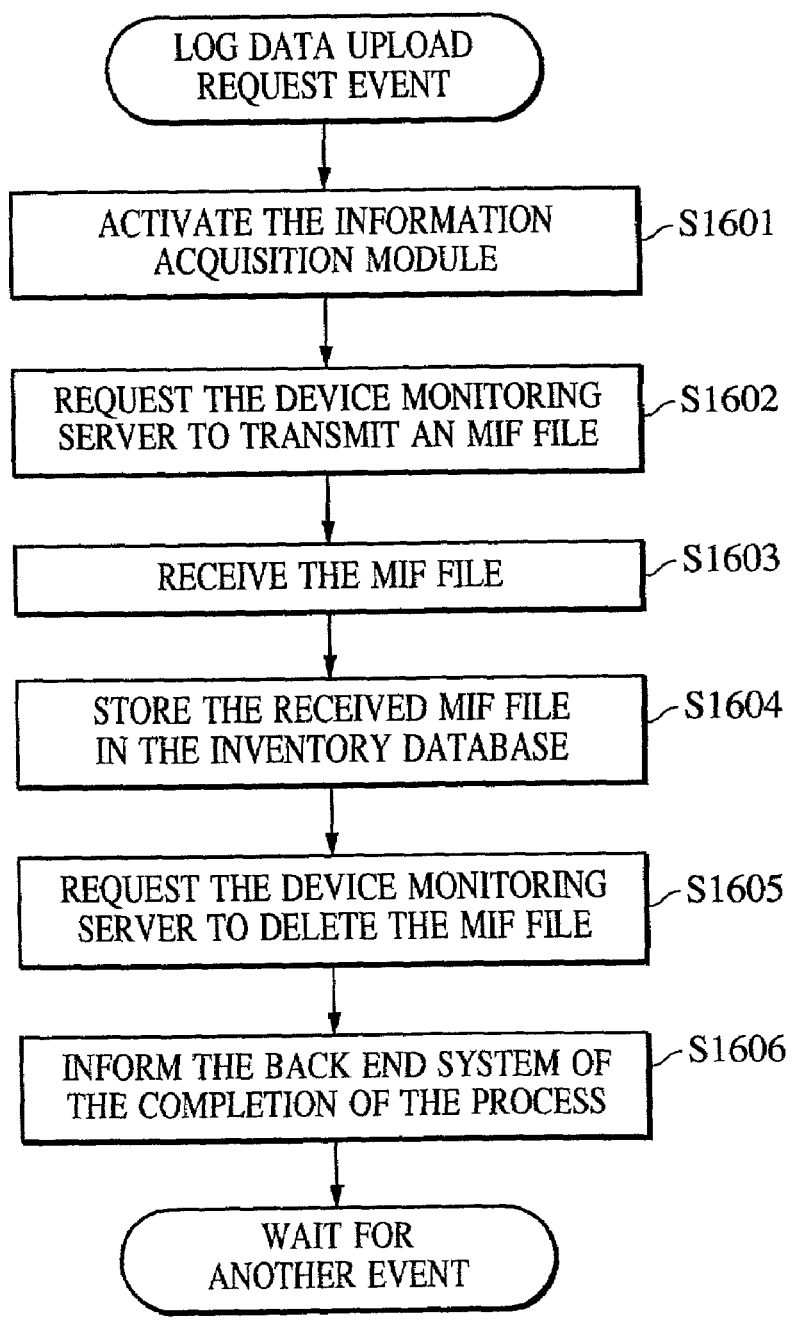
FIG. 16 is a flow chart of a process performed by the device information processing module 901 in response to a request for uploading log data.

FIG. 16 is a flow chart of a process performed by the device information processing module 901 in response to a log data upload request.

If a request for uploading log data is received, the common information processing module 1201 is activated (step S1601), and a request for transmitting an MIF file in which log data is described is issued to the device monitoring module 203*a* (step S1602).

As a response to the request, the MIF file is received (step S1603) and stored in the inventory database 109 (step S1604). Thereafter, a request for deleing the MIF file is issued to the device monitoring server 203*a* (step S1605). When the above process is completed, the back-end system is notified of the completion of the process (step S1606).

Procedure Performed by the Device Monitoring Server

Figure 17:
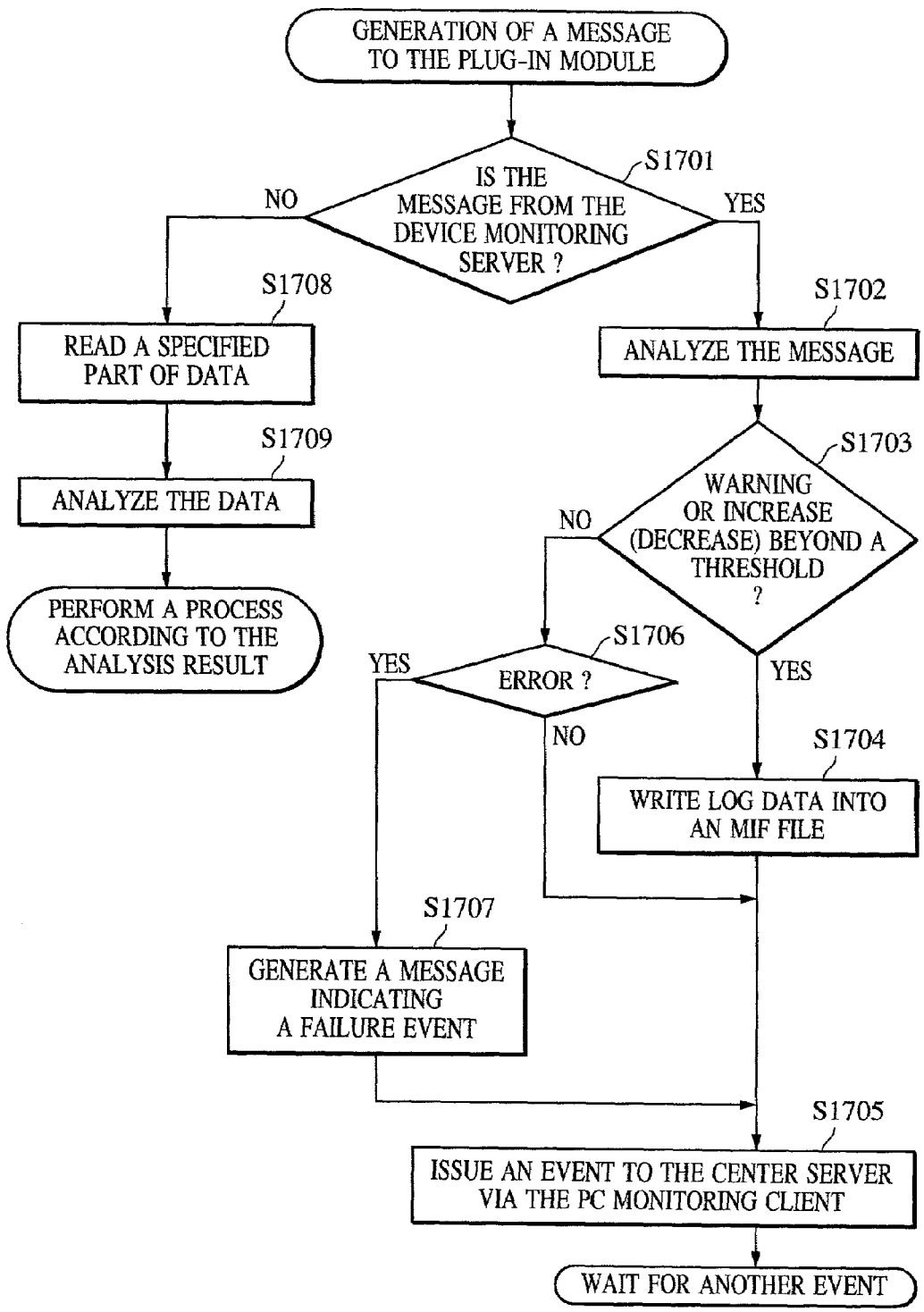
FIG. 17 is a flow chart of a process performed by a user-site plug-in module 203b in response to receiving a message or an event issued to the plug-in module.

FIG. 17 is a flow chart of a process performed by a user-site plug-in module 203b in response to receiving a message or an event issued to the plug-in module. If a message is issued by the center server 110 to the user-site plug-in module 203b, the message is stored by the PC monitoring client module 203d in a predetermined storage area. Therefore, the user-site plug-in module 203b always monitors or checks at fixed intervals the PC monitoring client module 203d to determine whether a message addressed to the user-site plug-in module 203b has arrived.

If a message is detected, it is determined whether the message is from the device monitoring server 203a (step S1701). If yes, the message is analyzed (step S1702) to determine whether the message is a warning or the message indicates a change in value beyond a threshold, log data is written in an MIF file, and an event is issued to the center server 110 via the PC monitoring client module 203d to notify that the log file will be uploaded (step S1705).

If the message indicates neither a warning nor a change beyond a threshold, it is determined whether the event indicates an error (step S1706). If yes, a message indicating a failure event is generated (step S1707), and the process goes to step S1705.

In the case where the message is not from the device monitoring server 203a, it is determined that the message has been issued by the center server 110. In this case, the data written by the PC monitoring client module 203d in the predetermined storage area is read (step S1708), and a process is performed depending upon the content of the data, as shown in detail in FIG. 18.

Figure 18:
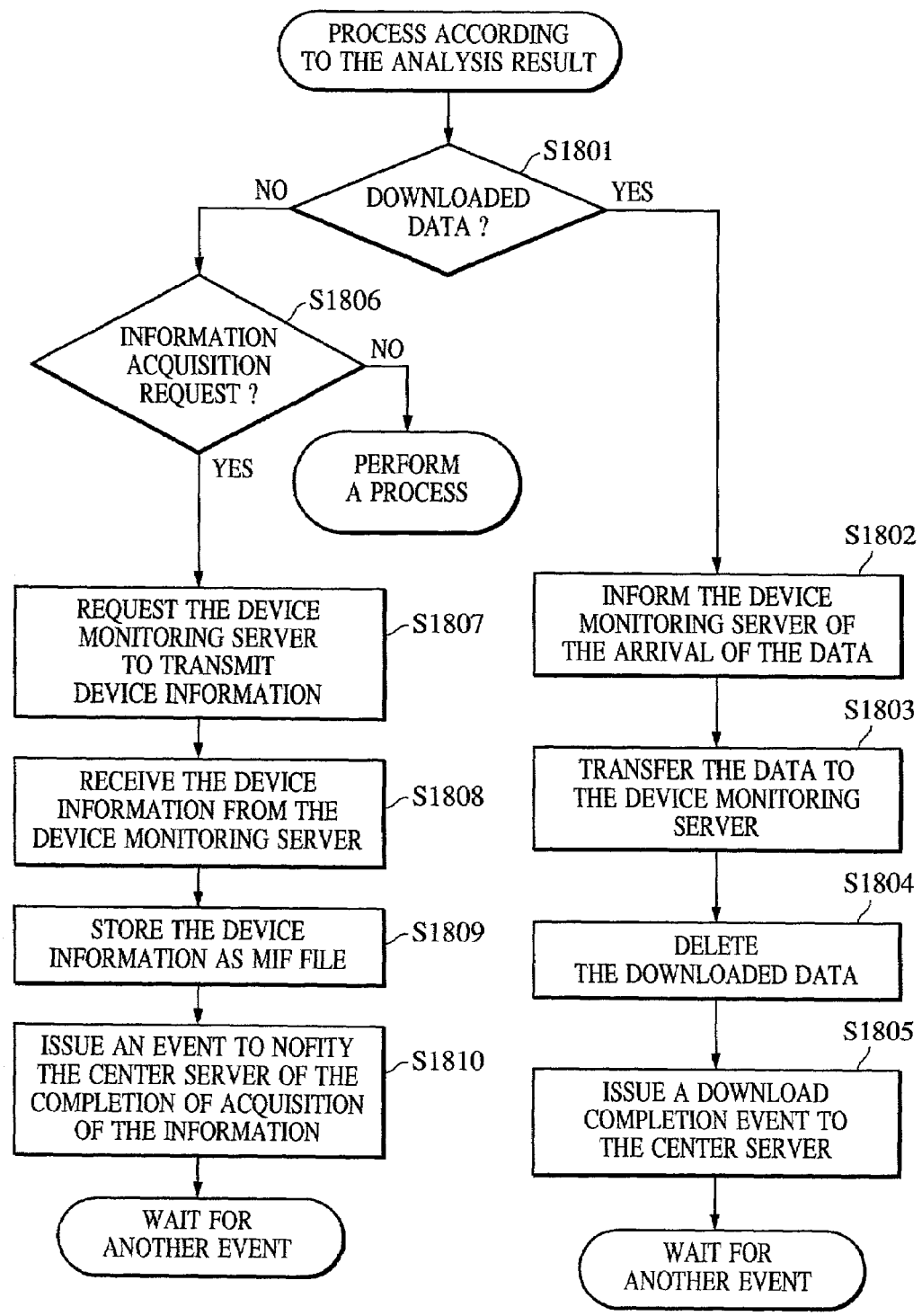
FIG. 18 is a flow chart of a process performed by the user-site plug-in module 203b in response to a message received from a center server 1101.

FIG. 18 is a flow chart of a process performed by the user-site plug-in module 203b in response to a message received from a center server 1101.

First, it is determined whether the message is download data (step S1801). If yes, the device monitoring server 203a is notified of the reception of the download data (step S1802), and the data is transferred to the device monitoring server 203a (step S1803). After transferring the data, the data is deleted (step S1804), and an event indicating the completion of the downloading process is issued to the center server 1101 (step S1805).

In the case where the message is not download data, it is determined whether the message is a request for acquiring device information (step S1806). If yes, a request for acquiring device information is issued to the device monitoring server 203a (step S1807).

As a response to the request, the device information is received from the device monitoring server 203a (step S1808). The received device information is stored in an MIF file (step S1809), and a message indicating that the device information has been acquired is issued to the center server 110.

Procedure Performed by the PC monitoring client module

Figure 19:
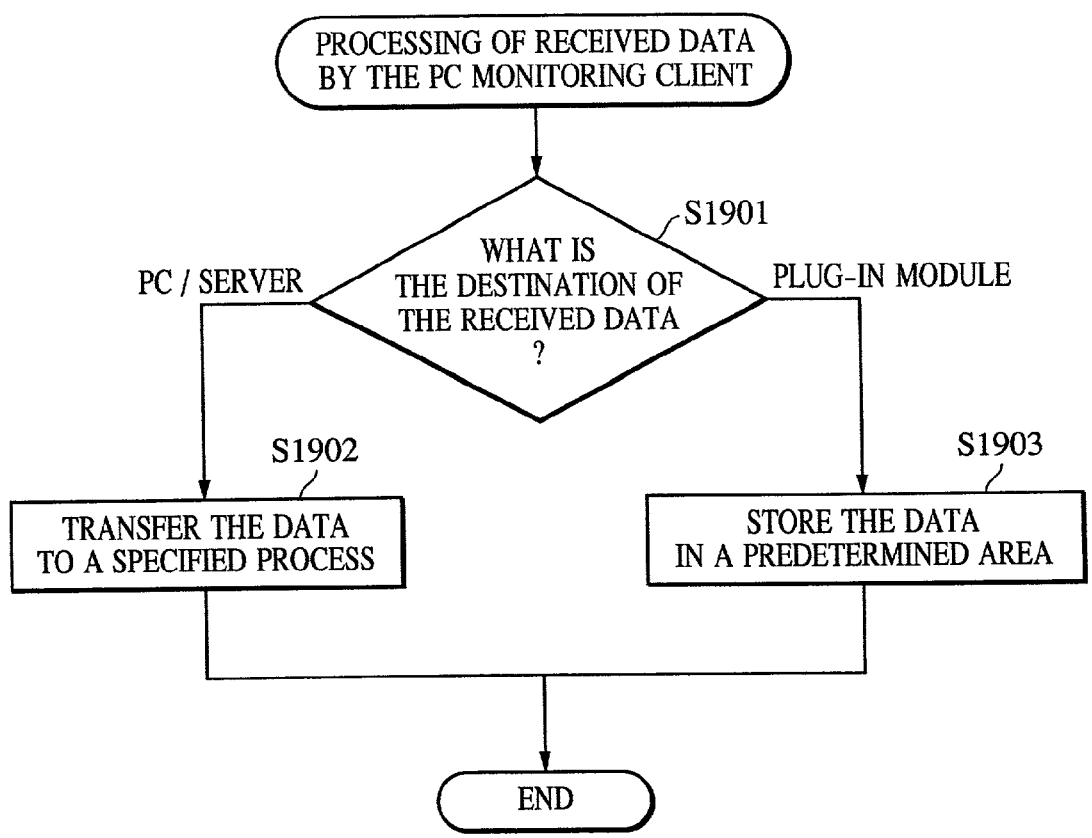
FIG. 19 is a flow chart of a process performed by a PC monitoring client module in response to receiving a message.

FIG. 19 is a flow chart of a process performed by a PC monitoring client module

In FIG. 19, it is determined where the received data is addressed (step S1901). If the message is addressed to a general-purpose computer in the PC/servers, the data is transferred to a specified process (step S1902). In the case where the message is addressed to the user-site plug-in module, the data is written in the predetermined storage area described above.

In the system according to the present embodiment, as described above, a monitoring system originally designed to monitor general-purpose computers can be used to also manage peripheral devices installed at the same site at which general-purpose computers are installed. This makes it possible to monitor, at the managing site, general-purpose computers and peripheral devices in a similar manner. Furthermore, it also becomes possible, at the managing site, to acquire information about a peripheral device and to set a parameter of a peripheral device via the monitoring system. Furthermore, it is possible to transmit log data from the managed site to the managing site.

The module which is added to the monitoring system originally designed to monitor general-purpose computers to achieve the capability of monitoring peripheral devices can be realized by means of software without needing additional special hardware and thus without causing increases in the installation space, the device cost, the maintenance cost, and the hardware size.

The present invention is not limited to a system in which managing information associated with peripheral devices is adapted to the software designed to manage general-purpose computers (PC/servers), but the present invention may also be applied to a system in which management information associated with PC/servers is adapted to the software for managing peripheral devices. In this case, for example, the configuration shown in FIG. 9 may be modified such that the peripheral devices 201 and the PC/servers 202 are replaced with each other; the device monitoring server 203a and the PC monitoring client module 203d are replaced with each other; the MIF file 203e is described in a format specific to a device; the user-site plug-in module 203b is constructed so as to have the capability of converting data from a format for use by the PC/servers into a format for use by the device; the center server performs a process associated with a peripheral device; the device processing module 901 performs a process associated with a PC/server; and the device center issues an event.

Request for Service Operation

In the remote site managing system according to the first or second embodiment described above, when a failure occurs in a device installed in a customer's office, a message indicating the occurrence of the failure is sent to the center system. In response, the failure is dealt with as described below. In particular, when the failure cannot be dealt with by the customer, a service operation request is generated to request a service company, a service dealer, or a service organization to deal with the failure.

Figure 20:
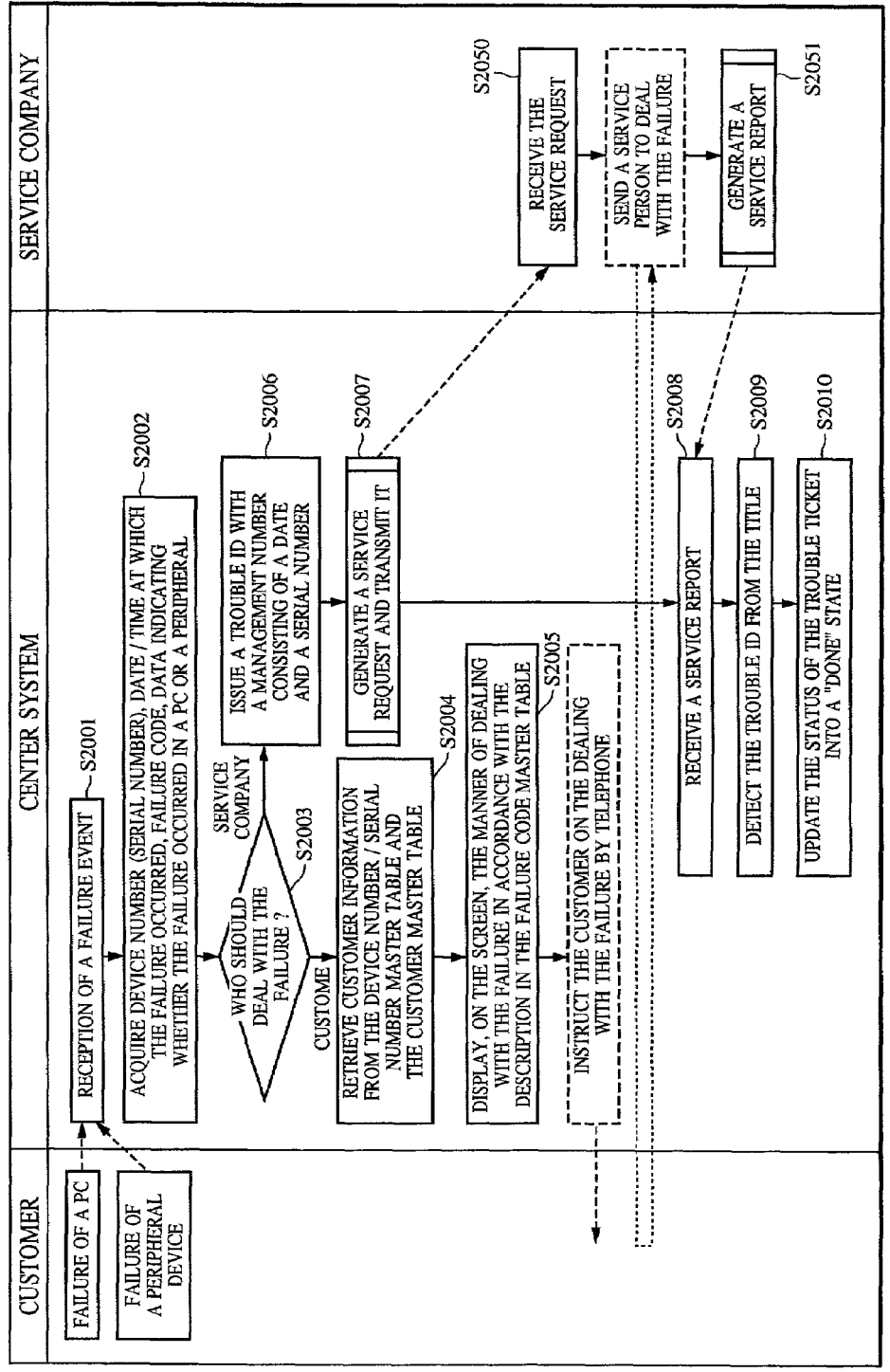
FIG. 20 is a flow chart of a process performed by an application system used in a managing site (center system).

FIG. 20 is a flow chart illustrating a process performed by the application system at the managing site (center system) to deal with a failure in response to receiving a message indicating the occurrence of the failure.

If a failure occurs in some PC/serer device or in some peripheral device at a managed site, a failure event is transmitted from a device monitoring server or a PC monitoring client module to a device center server or a center server. Furthermore, the failure event is transmitted to the application system (step S2001). FIG. 21 shows a data structure of a failure event. The data of a failure event includes the device number (serial number) of a device which encountered a failure, the date/time at which the failure occurred, a failure code indicating the failure, and the device type (PC or peripheral device) of a device having the failure.

The application system acquires the device number (serial number), the date/time at which the failure occurred, the failure code, and the device type (PC or peripheral device)

from the failure event data (step S2002). As required, information is displayed on the screen as shown in FIG. 21 or 22.

Figure 22:
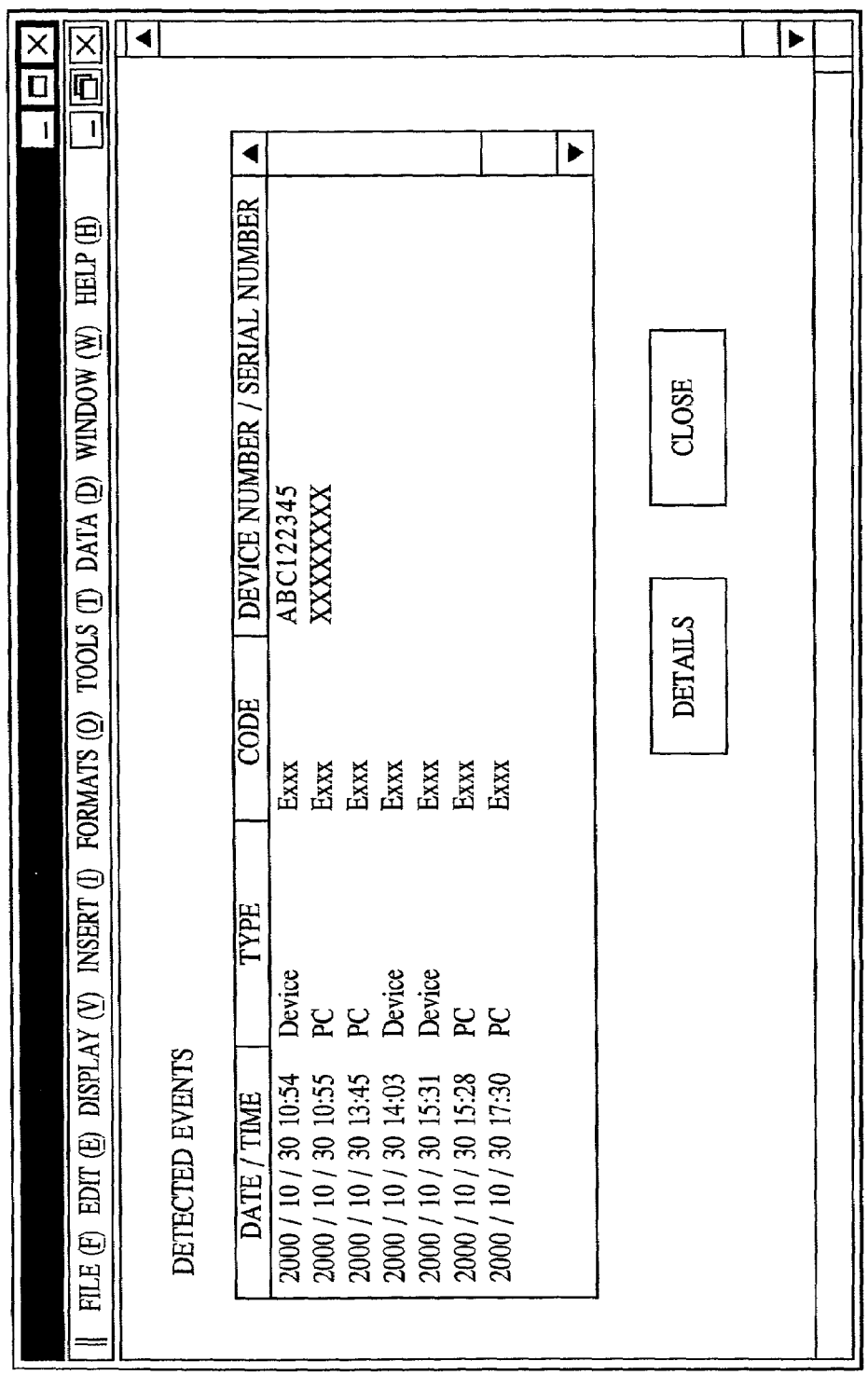
FIG. 22 illustrates a failure list displayed on a screen.

In the example shown in FIG. 22, a failure list is displayed on the screen. The failure list describes, for each failure, the date/time at which the failure occurred, the device type (PC or peripheral device) of a device which encountered the failure, the failure code indicating the type of the failure, and the device number (serial number) of the device which encountered the failure.

In the example shown in FIG. 23, information about a failure which occurred in a particular device is displayed on the screen. User information or customer information is displayed on the upper and left side of the screen, and device information of the device having the failure is displayed on the upper and right side. The history of failures which have occurred in the device installed in the customer's office is displayed on the bottom. The history of failures describes, for each failure, the date/time at which the failure occurred, the failure code indicating the failure, the failure type, the location in the device at which the failure occurred, and the note.

Who should deal with the failure is determined on the basis of the failure code and the device type (PC or peripheral device) using a failure code master table such as that shown in FIG. 24. The failure code master table such as that shown in FIG. 24 is stored in the inventory database 109 shown in FIG. 2.

As shown in FIG. 24, the failure code master table describes, for each failure type, the failure code of the failure, the device type (PC or peripheral device), who should deal with the failure (whether the customer or a service person), and the manner of dealing with the failure.

In step S2003, retrieval is performed using a failure code and a device type (PC or a peripheral device) as a key to determine who should deal with the failure. If it is determined that the customer should deal with the failure, the process proceeds to step S2004. However, if it is determined that a service company should deal with the failure, the process proceeds to step S2006.

In step S2004, customer information is acquired on the basis of the device number (serial number) described in the failure event. To acquire the customer information, the customer code and the customer sub-code corresponding to the device number (serial number) are first determined from a device number (serial number) master table such as that shown in FIG. 25. The device number (serial number) master table describes, for each device, the device number (serial number) of the device, the manufacturer name of the device, the customer code and the customer sub-code of the customer possessing the device, the location where the device is installed, and the service company code which provides maintenance service for that device.

After determining the customer code and the customer sub-code, the customer information corresponding to the customer code and the customer sub-code is read from a customer master table such as that shown in FIG. 26. The customer master table describes, for each customer, the customer code of the customer, the customer sub-code of the customer, the company name of the customer, the department/section name of the customer, the address of the customer, the telephone number of the customer, the facsimile number of the customer, the electronic mail address of the customer, the person at the customer who is responsible for the device, the contract level of the customer, the code of the service company which provides maintenance service for PC devices of the customer, and the code of the service company which provides maintenance service for peripheral devices of the customer. Customer codes and customer sub-codes are used to distinguish different departments/sections of the same company. More specifically, a customer code indicates a company and a customer sub-code indicates a department/section.

Figure 27:
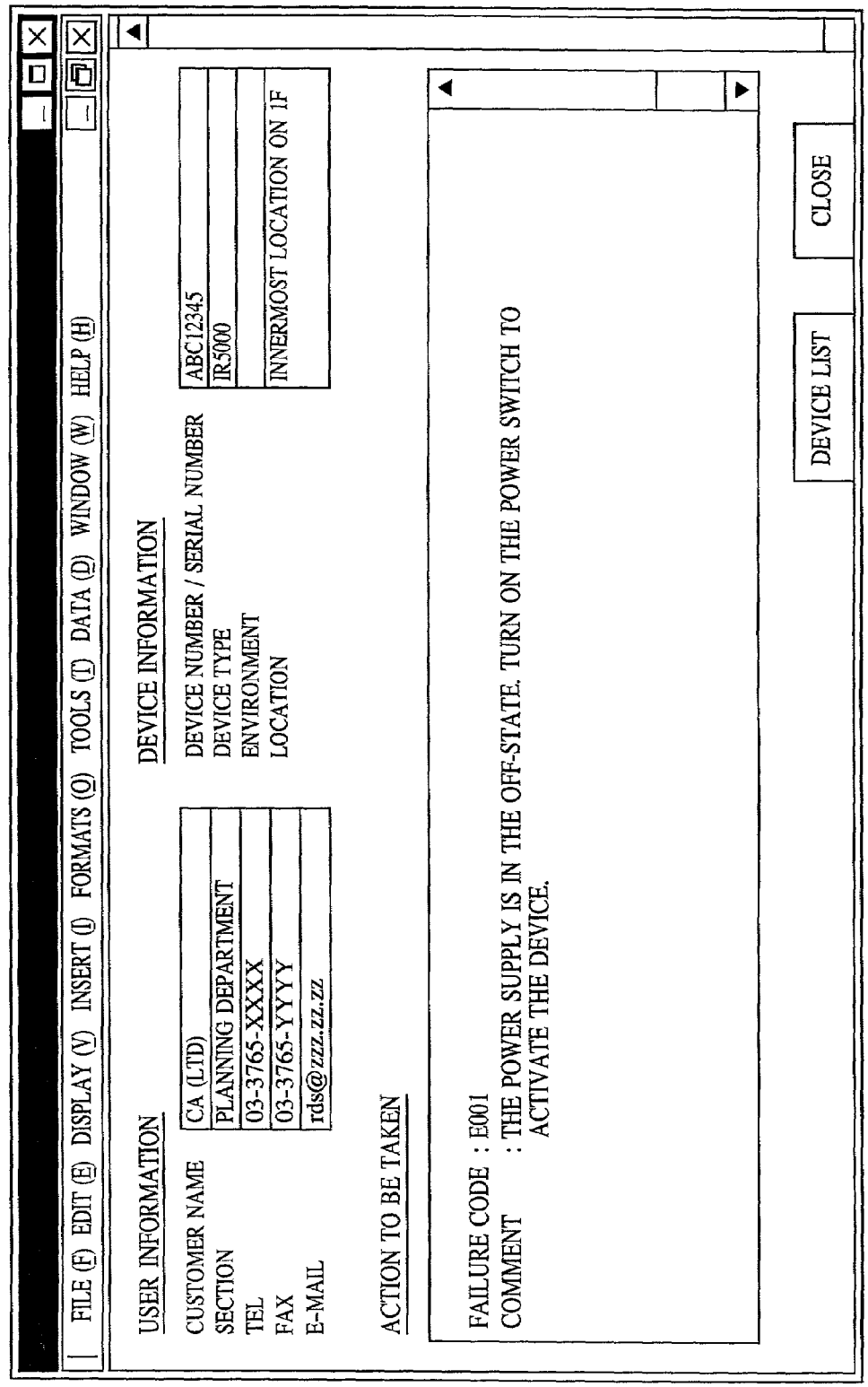
FIG. 27 illustrates a manner of displaying, on a display screen, a method of dealing with a failure.

Finally, the manner of dealing with the failure corresponding to the failure code is read from the failure code master table shown in FIG. 24, and displayed on the display screen as shown in FIG. 27 (step S2005). In the example shown in FIG. 27, information displayed on the screen includes the user information or customer information, the device information of the device having the failure, and the manner of dealing with the failure. When a human operator of the center system views the screen, the operator makes a telephone call to the customer to tell that a failure has occurred in the device and how to deal with the failure.

In step S2006 and steps following that, a request for a service operation is generated. First, a trouble ticket ID (also referred to as a trouble ID) is issued (step S2006). A trouble ticket ID is issued for each service operation request to identify the service operation request. Each time a new trouble ticket ID is issued, it is registered in a trouble ticket ID table such as that shown in FIG. 28, and the contents of service operation request and the progress of the service operation are managed. For example, a trouble ticket ID is given as "date+serial number".

As shown in FIG. 28, the trouble ticket table describes, for each service operation request, the trouble ticket ID of the service operation request, the status (progress) of the service operation, the date/time at which the service operation request was issued, the date/time at which the service operation request was dealt with (the service operation was performed), the customer code and the customer sub-code of the customer who issued the service operation request, the device number (serial number) of the device requested to be dealt with, the service company code of the service company which performed the requested service operation, the name of the person who performed the requested service operation, the cause of the failure dealt with in response to the service operation request, and the details of the service operation performed in response to the service operation request.

Thereafter, a service operation request is generated (step S2007). The details of the process of generating a service operation request will be described later. After generation of the service operation request, it is transmitted to the service company by means of an electronic mail (step S2008). Herein, the service operation request may be described in the electronic mail itself, or the service operation request may be attached to the electronic mail.

In response, the service company performs a service operation and issues a service operation report via an electronic mail (step S2008). Herein, the service operation report may be described in the electronic mail itself or the service operation report may be attached to the electronic mail.

In any case, the trouble ticket ID assigned to the service operation request is described in the "Subject" field of the electronic mail so that the trouble ticket ID can be recognized (step S2009). In the trouble ticket table shown in FIG. 28, the status corresponding to the recognized trouble ticket ID is changed to "done". Furthermore, the cause described in the service operation report and the message (text data) described in the "action taken" field are copied into the "cause" field and the "action taken" field of the trouble ticket table.

Generation and Transmission of a Service Operation Request

Figure 29:
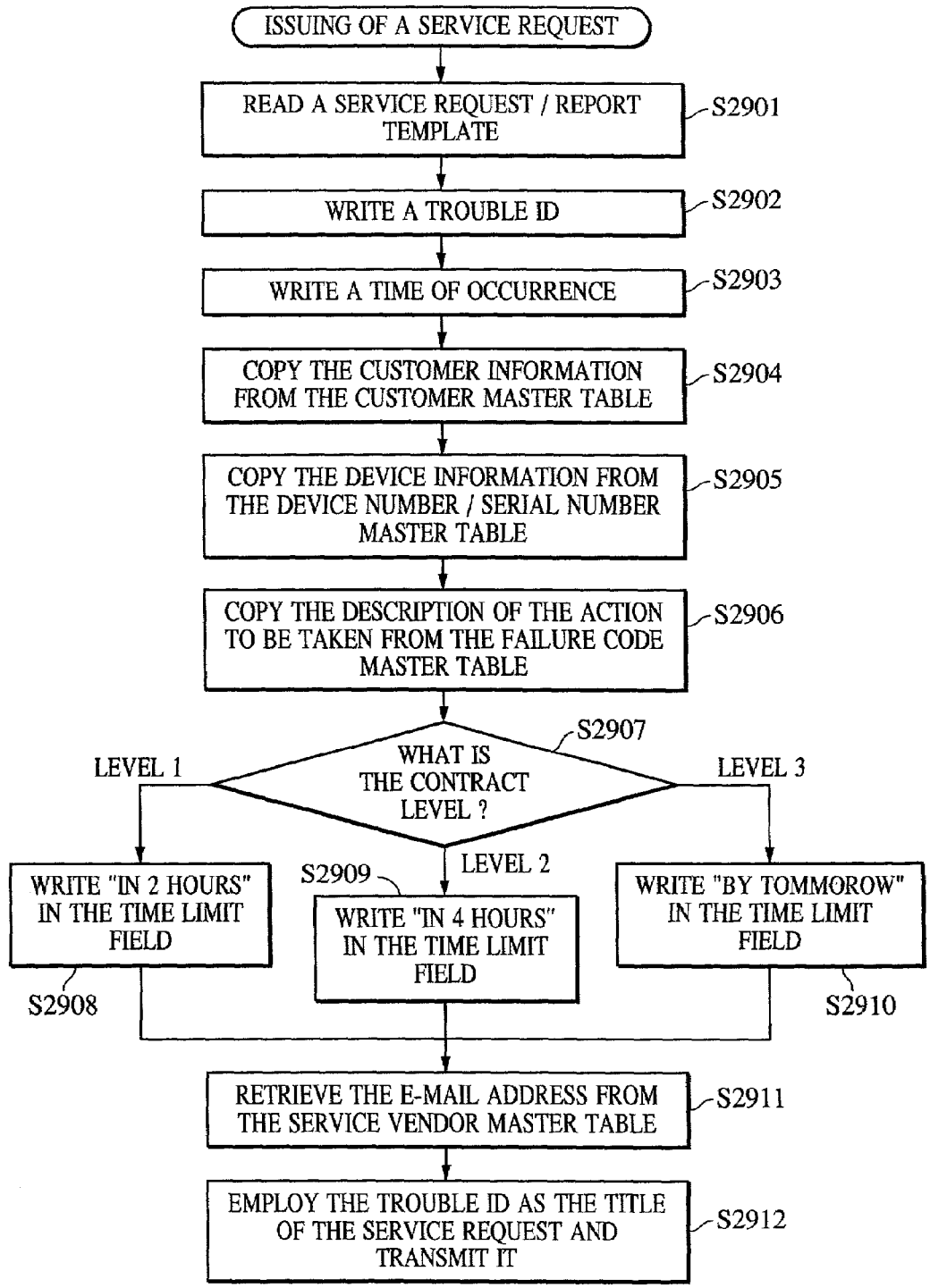
FIG. 29 is a flow chart illustrating a process of generating and transmitting a request for a service operation.

FIG. 29 is a flow chart illustrating the details of the process performed in step S2007 in FIG. 20 to generate and transmit the service operation request. First, a template file of a service operation request/report is read (step S2901). In the present embodiment, a service operation request and a service operation report are described on a single sheet. Alternatively, a service operation request and a service operation report may be described separately on different sheets.

FIG. 30 illustrates an example of a template file of a service operation request/report. The template file includes blank fields in which a trouble ticket ID (trouble ID), a date/time at which a failure occurred, user information of a customer, device information of a device in which the failure occurred, a failure code, an action to be taken to deal with the failure, a cause, and an action taken will be described.

Thus, the trouble ticket ID issued in step S2006 shown in FIG. 20 is copied in the corresponding field (step S2902) of the template. Thereafter, the date/time acquired in step S2002 in FIG. 20 is copied in the template (step S2903). Furthermore, customer information (user information) is read in a similar manner to step S2004 shown in FIG. 20 and copied in the template (step S2904). Device information is then read in a similar manner to step S2004 shown in FIG. 20 and copied (step S2905). Thereafter, the manner of dealing with the failure is read in a similar manner to step S2005 shown in FIG. 20 and copied together with the failure code obtained in step S2002 (step S2906).

Thereafter, the contract level is detected from the customer information (step S2907). In the case where the contract level is determined as level 1, it is required to urgently deal with the failure, and thus the time limit is set to a 2-hours-later time and described in the template (step S2908). In the case where the contract level is determined as level 2, the time limit is set to a 4-hours-later time and described in the template (step S2909). In the case where the contract level is determined as level 4, the time limit is set to the next day and described in the template (step S2910).

Thereafter, a forwarding address of the service operation request, for example, the electronic mail address of the service company, is read from a service company master table such as that shown in FIG. 31. To this end, the service company code is first identified. In the case where the device type (PC or a peripheral device) is determined in step S2002 in FIG. 20 as a "PC", the PC service company code is read from the customer master table shown in FIG. 26. If the device type is determined as a peripheral device, the peripheral device service company code is read, and the electronic mail address corresponding to the service company code is read from the table shown in FIG. 31.

As shown in FIG. 31, the service company master table describes, for each service company, the service company code of the service company, the type of service provided by the service company, the company name of the service company, the department/section name of the service company, the address of the service company, the telephone number of the service company, the facsimile number of the service company, the electronic mail address of the service company, and the name of a service person of the service company. In the present embodiment, the service company code is assigned differently for each department/section of respective service companies.

Finally, the trouble ticket ID is described in the subject field of the electronic mail, and the electronic mail is transmitted to the electronic mail address acquired in step S2911 together with the attached template file filled of the service operation request/report filled with the information in the above-described manner (step S2912).

Generation and Transmission of a Service Operation Report

A computer installed in the service company receives the electronic mail and the service operation request/report attached thereto (step S2050). The contents of the attached service operation request/report are displayed on a display. A service person reads the contents of the service operation request/report and visits the customer to perform the service operation.

Figure 32:
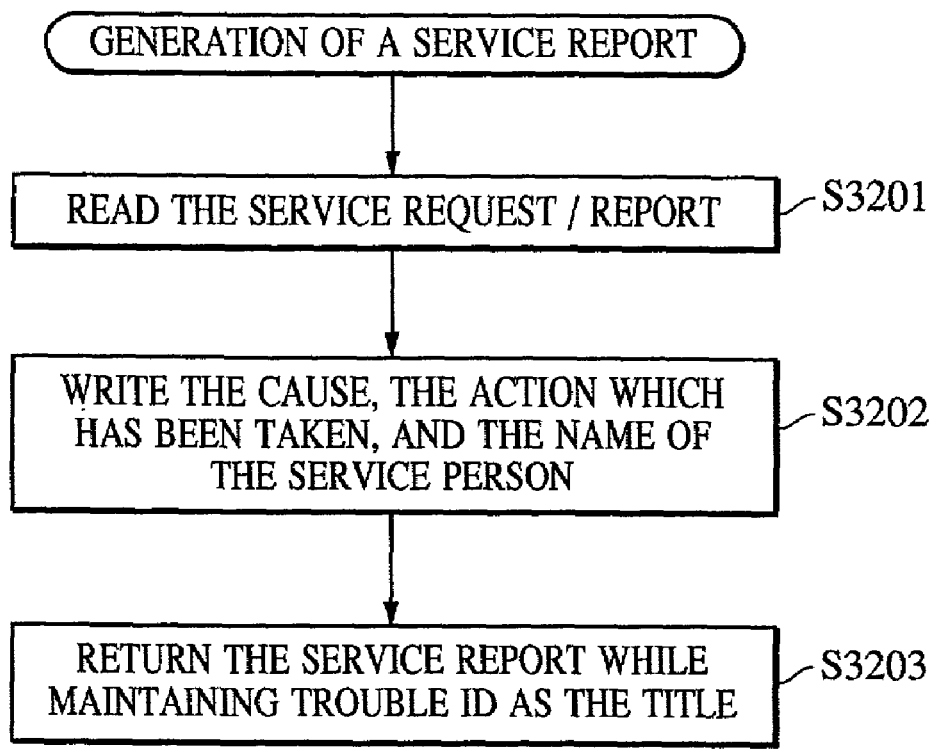
FIG. 32 is a flow chart illustrating a process of generating and transmitting a service operation report.

The computer of the service company then generates a service operation report and transmits it. FIG. 32 is a flow chart illustrating the process of generating and transmitting a service operation report. First, the file of the service operation request/report received in step S2050 in FIG. 20 is read (step S3201). Furthermore, a message indicating the cause of the failure, and a message indicating the action taken to deal with the failure, the name of the service person who dealt with the failure are input via a keyboard so as to describe them in the file of the service operation request/report (step S3202). Furthermore, the trouble ticket ID of the service operation request is described in the subject field of the electronic mail, and the electronic mail is transmitted together with the attached service operation request/report generated in the above-described manner.

Generation of a Device Operation Report

The remote site managing system also has the capability of generating and transmitting a device operation report as described below. FIG. 35 illustrates an example of a template file of a device operation report. In the device operation report, the total number of copied sheets during the present month, the numbers of copied sheets for the respective copying modes, the numbers of copied sheets for the respective sheet sizes, the failure history, and other information are described.

Figure 33:
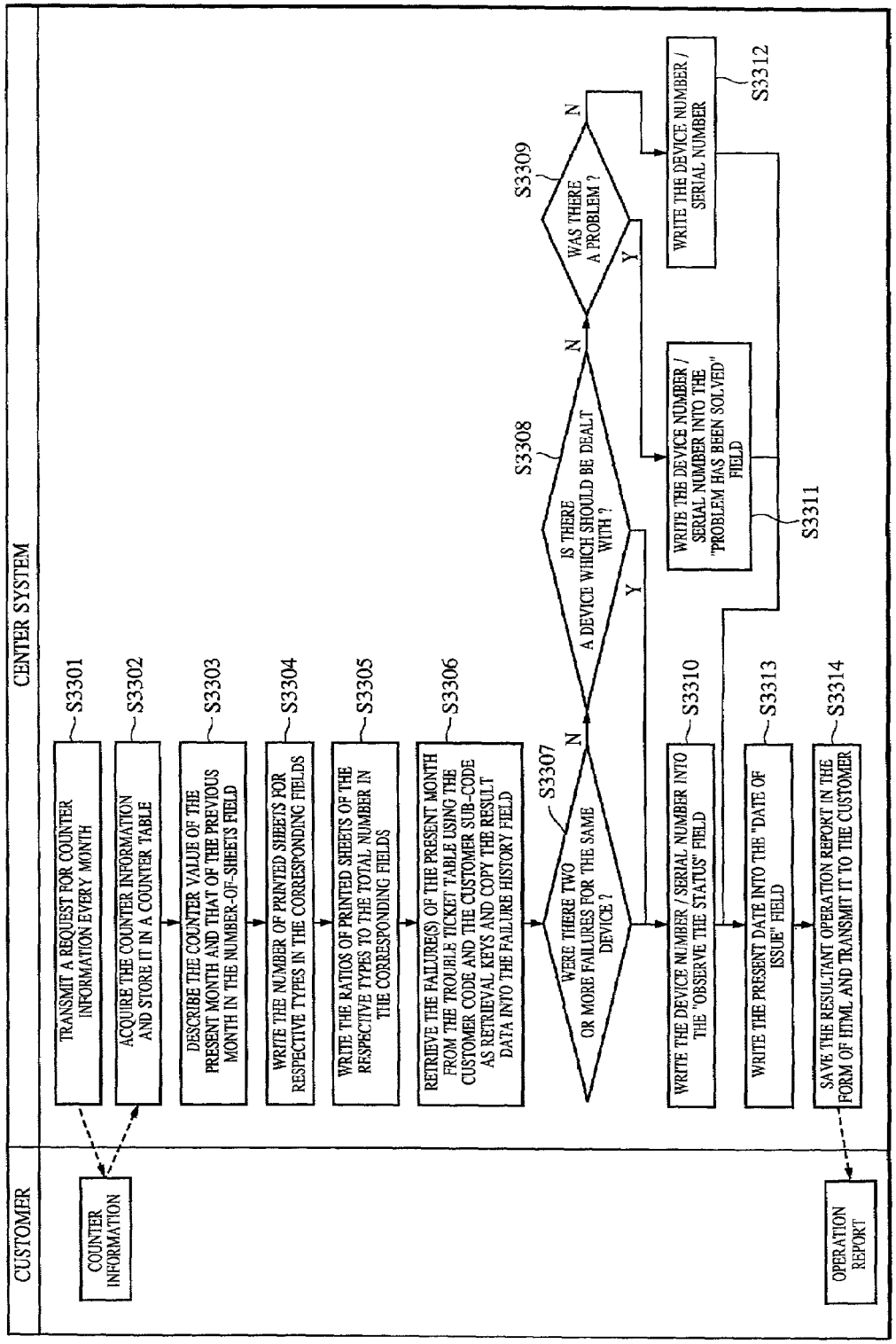
FIG. 33 is a flow chart of a process performed by an application system used in a managing site (center system).

FIG. 33 is a flow chart illustrating a process performed by an application system at a managing site (center system) to issue a device operation report to a customer.

A request command is transmitted to the device monitoring server at the managed site on an once-every-month basis to acquire counter information of a particular device (step S3301). The received counter information is stored in a counter information table such as that shown in FIG. 34. As shown in FIG. 34, in the counter information table, device operation information is described for each month. More specifically, the device operation information described in the counter information table includes the device number (serial number) of the device, the month of the report, and the cumulative values as measured for that month in terms of the following numbers of sheets: the total counter value, the number of sheets printed on both-sides, the number of sheets printed in a multiple mode, the number of sheets printed in a 2-in-1 mode, the number of sheets printed in a 4-in-1 mode, the number of sheets output via facsimile, the number of sheets printed in accordance with print data output from a host computer, the number of scanned-and-transmitted sheets, the number of transmitted electronic mails, and the numbers of copied or printed sheets for the respective sheet sizes. That is, the counter information includes data indicating the respective counter values associated with the numbers described above.

The total counter value as measured for the previous month is then subtracted from the total counter value as measured for the present month to calculate the total number of sheets copied or printed during the present month and the calculated number is described in the template file of the device operation report. Similarly, the numbers of sheets copied or printed in the respective copying modes during the present month are described (step S3304). Thereafter, the ratios (in percents) of the numbers of sheets copied or printed in the respective modes to the total number of sheets are described in the template file (step S3305).

The trouble ticket table is then searched using the customer code, the customer sub-code, and the date/time=the present month as retrieval keys to detect trouble ticket IDs corresponding to troubles which occurred during the present month. The data indicating the detected trouble ticket IDs is described in the failure history (step S3306).

Thereafter, it is determined whether or not two or more of the detected trouble ticket IDs are associated with the same device number (step S3310). Furthermore, it is determined whether there is a trouble ticket ID whose status of the service operation request is "not completed" (step S3308). It is further determined whether there is a device which had, in the past, a failure that has already been dealt with (step S3309).

The device number corresponding to the trouble ticket ID is described depending upon the result of the determination. More specifically, in step S3310, the device number of a device which has encountered a failure two or more times or the device number corresponding to a trouble ticket ID which has not yet been dealt with is described in the field "There is a tendency for the frequency of troubles to increase. Observation in required for a while". In step S3311, the device number is described in the field "There is no problem at all". In step S3312, the device number is described in the field "Although a trouble occurred, the trouble has been resolved".

The present date is then described in the template file (step S3313). Finally, the template file is saved in the HTML format and transmitted to the customer (step S3314). In step S3314, the device operation report in the HTML (Hyper Text Markup Language) format may be transmitted as data attached to an electronic mail, or a URL (Uniform Resource Location) address indicating the location of the device operation report in the HTML format is noticed via an electronic mail so that the customer can obtain the device operation report via a WWW browser.

OTHER EMBODIMENTS

Furthermore, the objects of the present invention may also be achieved by supplying a storage medium, on which a software program implementing the functions of any of the embodiments described above is stored, to a system or an apparatus whereby a computer (CPU or MPU) in the system or apparatus reads and executes the program code stored on the storage medium.

In this case, it should be understood that the program code read from the storage medium implements the novel functions of invention and thus the storage medium storing the program code falls within the scope of the present invention.

The data of device information may be stored on a HDD installed in an image processing apparatus or an image data expanding apparatus, an externally connected storage medium, or a server or the like which can be accessed from the image data expanding apparatus. The data of device information may be described in an arbitrary form determined by a user.

Specific examples of such a storage medium for storing the program code include a floppy disk, a hard disk, an optical disk, a magneto-optical disk, a CD-ROM, a magnetic tape, a non-volatile memory card, and a ROM.

Furthermore, the scope of the present invention includes not only such a system in which the functions of any embodiment described above are implemented simply by reading and executing a program code on a computer but also a system in which a part of or the whole of process instructed by the program code is performed using an OS (operating system) on the computer.

Furthermore, the scope of the present invention also includes a system in which a program code is transferred once from a storage medium into a memory provided in a function extension board inserted in a computer or provided in a function extension unit connected to the computer, and then a part of or the whole of process instructed by the program code is performed by a CPU or the like in the function extension board or the function extension unit thereby implementing the functions of any embodiment described above.

In the case where the present invention is implemented on a storage medium such as that described above, program codes corresponding to one or more of the flow charts (described above with reference to FIGS. 5 to 7, 13 to 20, 29, and 32) are stored on the storage medium.

As described above in detail, the present invention makes it possible to manage, at a managing site, both types of devices, that is, PC/servers and peripheral devices installed in an office, in an unified fashion.

In particular, the managing site system can automatically receive information indicating a failure which has occurred or indicating a high possibility that a failure will occur in some of PC/servers or peripheral devices installed in the office and can provide maintenance services without troubling the customer.

Furthermore, transmission of a request to a maintenance service company and reception of a service operation report from the service company can be performed in an unified fashion. This allows a customer to receive maintenance service for various devices simply by making a contract with one management site without having to make contracts with various service companies.

It is also possible to automatically generate a report about the operation of a particular device installed in an office, on the basis of the counter information and the history of failures and transmit it to a customer.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A device managing apparatus for managing a device via a network, said device managing apparatus comprising:
    failure detection means for receiving data indicating an occurrence of a failure in the device;
    first generating means for generating data indicating a request for a service operation in accordance with reception of the data by said failure detection means;
    selection means for selecting a company among a plurality of companies which should perform the service operation for the device;

transmission control means for transmitting the data indicating the request for the service operation generated by said first generating means to the selected company assigned to perform the service operation for the device;

management means for managing the status of the service operation corresponding to the request;

count information acquisition means for acquiring count information associated with the device; and second generating means for generating data indicating a device operation report associated with the device, in accordance with the count information acquired by said count information acquisition means, wherein, in accordance with the status of the service operation corresponding to the request managed by said management means, said second generating means describes, in the device operation report, device information indicating which device corresponds to the request for the service operation which has not been completed or which device corresponds to the request for the service operation which has been resolved.

2. A device managing program stored on a computer-readable storage medium and executed by a computer to manage a device via a network, said program comprising:

a failure detection step, of receiving data indicating an occurrence of a failure in the device;

a first generation step, of generating data indicating a request for a service operation in accordance with reception of the data in said failure detection step;

a selection step, of selecting a company among a plurality of companies which should perform the service operation for the device;

a transmission control step, of transmitting the data indicating the request for the service operation generated in said first generation step to the selected company assigned to perform the service operation for the device;

a management step, of managing the status of the service operation corresponding to the request;

a count information acquisition step, of acquiring count information associated with the device; and a second generation step, of generating data indicating a device operation report associated with the device, in accordance with the count information acquired in said count information acquisition step, wherein, in accordance with the status of the service operation corresponding to the request managed in said management step, said second generation step includes describing, in the device operation report, device information indicating which device corresponds to the request for the service operation which has not been completed or which device corresponds to the request for the service operation which has been resolved.

* * * * *